(12) United States Patent
Koeppen et al.

(10) Patent No.: US 7,817,272 B2
(45) Date of Patent: Oct. 19, 2010

(54) HIGH-RESOLUTION SPECTRALLY ADJUSTABLE FILTER

(75) Inventors: Christopher S. Koeppen, New Hope, PA (US); Steven E. Parks, Mertztown, PA (US)

(73) Assignee: Aegis Lightwave, Inc., Woburn, MA (US)

( * ) Notice: Subject to any disclaimer, the term of this patent is extended or adjusted under 35 U.S.C. 154(b) by 183 days.

(21) Appl. No.: 12/135,354

(22) Filed: Jun. 9, 2008

(65) Prior Publication Data

US 2009/0303562 A1 Dec. 10, 2009

(51) Int. Cl.
*G01J 3/26* (2006.01)

(52) U.S. Cl. .................................... 356/326
(58) Field of Classification Search .............. None
See application file for complete search history.

(56) References Cited

U.S. PATENT DOCUMENTS

| | | | |
|---|---|---|---|
| 5,960,133 A | 9/1999 | Tomlinson | |
| 6,097,859 A | 8/2000 | Solgaard et al. | |
| 6,204,946 B1 | 3/2001 | Aksyuk et al. | |
| 6,801,551 B1 * | 10/2004 | Delfyett et al. | 372/23 |
| 6,891,676 B2 | 5/2005 | Ford et al. | |
| 6,983,090 B2 | 1/2006 | Weber et al. | |
| 7,002,697 B2 | 2/2006 | Domash et al. | |
| 7,253,897 B2 | 8/2007 | Moon et al. | |
| 7,257,288 B1 | 8/2007 | Strasser et al. | |
| 7,408,639 B1 | 8/2008 | Strasser et al. | |
| 7,605,976 B1 * | 10/2009 | Wolleschensky et al. | 359/386 |
| 2004/0136074 A1 | 7/2004 | Ford et al. | |
| 2007/0041683 A1 | 2/2007 | Keyworth | |
| 2008/0085119 A1 | 4/2008 | Ye et al. | |
| 2008/0273560 A1 * | 11/2008 | Stelmakh | 372/26 |

OTHER PUBLICATIONS

Cahill, Michael; Bartolini, Glenn, "Distribution of Embedded DWDM Channel Monitors in Pass-Through Node Limited Transmission Links," Optical Fiber Communication and the National Fiber Optic Engineers Conference; Volume , Issue , Mar. 25-29, 2007 pp. 1-4.
G. D. Bartolini, "Low-cost optical monitoring for DWDM systems," Proc. OSA Topical Meeting on Optical Amplifiers, OWB1 (2004).
Bayspec product sheet downloaded from http://www.bayspec.com/pdf/OCPM.pdf on Aug. 6, 2007.
JDSU, product sheet downloaded from http://products.jdsu.com/assets/public/pdf/wbeb_ds_cms_ae_020806.pdf on Aug. 6, 2007.

* cited by examiner

*Primary Examiner*—Tu T Nguyen
(74) *Attorney, Agent, or Firm*—Fish & Richardson P.C.

(57) ABSTRACT

For spectrally filtering at least one input beam, a first reflective element is configured to tilt to multiple tilt orientations that each corresponds to a different angle of propagation of at least one input beam. One or more optical elements are configured to change at least some of the relative angles of propagation of the input beam for different tilt orientations of the first reflective element. A spectrally dispersive element is configured to receive the input beam at a location at which the central ray of the input beam is incident at different points on the spectrally dispersive element for each of the tilt orientations, and configured to disperse spectral components of the input beam at different respective angles in a spectral plane. The first reflective element is configured to tilt to select at least one and fewer than all of the dispersed spectral components to be directed to a selected output path.

19 Claims, 22 Drawing Sheets y-axis is orthogonal to spectral plane y-axis is orthogonal to spectral plane y - axis is orthogonal to spectral plane

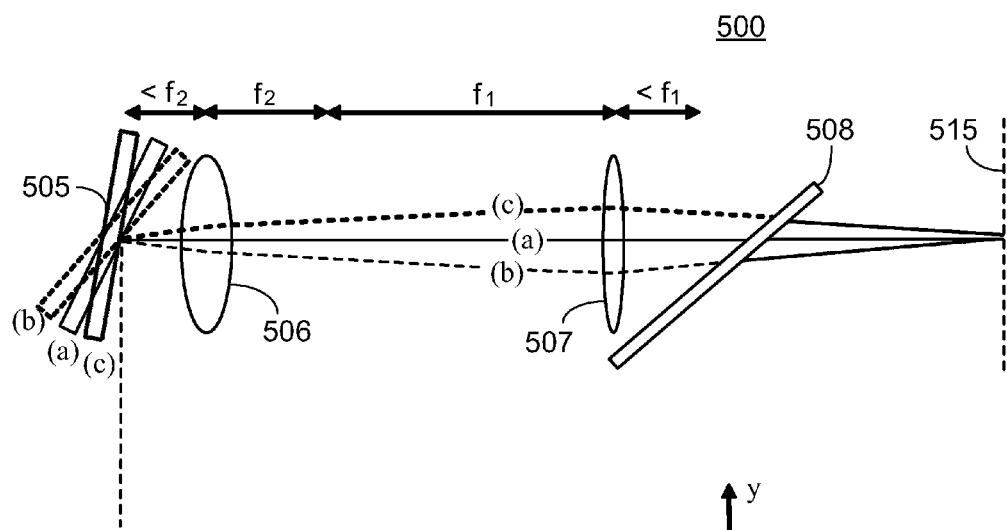
FIG. 5C  y-axis is orthogonal to spectral plane

HIGH-RESOLUTION SPECTRALLY ADJUSTABLE FILTER

BACKGROUND

This description relates to spectrally adjustable filtering.

Devices that spectrally filter and/or detect light can be used in optical communication systems, such as wavelength division multiplexed (WDM) systems, for adjustable filtering and attenuation of spectral components (or "wavelengths" or "channels") that are multiplexed together in the WDM spectrum. Such devices can be used for optical detection and monitoring of spectral components in the WDM spectrum. Typically, each spectral component has a nominal wavelength corresponding to the center frequency of a channel. In some systems, each spectral component has a spectral shape with a central lobe that has a narrow enough linewidth such that adjacent spectral components, whose center frequencies are separated by a given channel spacing, do not overlap significantly. In some systems, spectral components comprise respective sub-bands of wavelengths over a continuous spectrum that does not necessarily have any separation between adjacent spectral components. It is understood that the term "spectral component" as used herein should be construed broadly, and encompasses these various examples and other examples as understood in the art.

Wavelength filtering devices are typically classified as fixed or adjustable. Fixed devices filter a predetermined spectral band while adjustable filters allow reconfiguration of the wavelengths being filtered. Adjustable filtering devices provide the ability to dynamically update system configuration to optimize parameters such as transmission performance and bandwidth utilization. Adjustable filters also enable system operators to provision (turn up) new wavelengths and services.

Optical spectrum monitoring devices can be used within a WDM system to monitor system performance by measuring one or more optical signal attributes including wavelength, optical power, optical signal-to-noise ratio (OSNR), spectral shape, bit-rate, and polarization state, among others. The information provided by optical spectrum monitors may be utilized for system health reporting, fault location and analysis, feedback control and system optimization, and for other purposes.

Some optical component designs use optical elements in imaging configurations to enable and adjust functionality and performance. Some spectral filters utilize elements in imaging configurations. That is, they utilize elements to image beams or spectral components originating at one point in space to an intersection at a different point in space within the plane of spectral dispersion. These spectral filters place functional elements at the convergence points of the imaging configurations. Moreover, the functional elements are characteristically placed at distances from the imaging elements, e.g. lenses, that are equal to or greater than the focal lengths of the imaging elements.

A disadvantage of utilizing imaging configurations is that the optical path lengths of such configurations can be exceedingly long as the placement of the functional components are dictated by the focal lengths of the imaging elements (lenses). It is generally not possible to simply reduce the focal length without compromising spectral performance or cost or both. In particular, lens aberration effects (and associated spectral performance degradation) combined with the associated cost premiums of aspheric lenses that can provide acceptable performance and reliability, typically limit the applicability of imaging configurations. Accordingly, for many current WDM systems, which place a significant premium on size, performance, and cost, devices that employ imaging configurations may be at a disadvantage and may not even be realizable for some applications and requirements.

SUMMARY

In one aspect, in general, an apparatus for spectrally filtering at least one input beam includes a first reflective element configured to tilt to multiple tilt orientations that each corresponds to a different angle of propagation of at least one input beam. The apparatus includes one or more optical elements configured to change at least some of the relative angles of propagation of the input beam for different tilt orientations of the first reflective element. The apparatus includes a spectrally dispersive element configured to receive the input beam at a location at which the central ray of the input beam is incident at different points on the spectrally dispersive element for each of the tilt orientations, and configured to disperse spectral components of the input beam at different respective angles in a spectral plane. The first reflective element is configured to tilt to select at least one and fewer than all of the dispersed spectral components to be directed to a selected output path.

Aspects can include one or more of the following features.

The apparatus further includes a second reflective element configured to receive a plurality of the dispersed spectral components from the spectrally dispersive element.

The second reflective element is configured to direct the selected spectral components to be dispersed at least a second time by the spectrally dispersive element.

The second reflective element is configured to direct the selected spectral components to be dispersed by the spectrally dispersive element at least four times.

The one or more optical elements are configured to change at least some of the relative angles of propagation so that a maximum angular separation among the relative angles of propagation decreases.

The relative angles of propagation of the input beam for different tilt orientations of the first reflective element diverge at a first maximum angular separation and the one or more optical elements are configured to change at least some of the angles of propagation so that the relative angles of propagation of the input beam for different tilt orientations of the first reflective element diverge at a second maximum angular separation smaller than the first maximum angular separation.

The relative angles of propagation of the input beam for different tilt orientations of the first reflective element diverge at a first maximum angular separation and the one or more optical elements are configured to change at least some of the angles of propagation so that the relative angles of propagation of the input beam for different tilt orientations of the first reflective element converge at a second maximum angular separation smaller than the first maximum angular separation.

The one or more optical elements are configured to substantially preserve collimation of the input beam over the entire propagation path through the one or more optical elements.

The one or more optical elements comprise at least one prism.

The one or more optical elements comprise two lenses having different focal lengths, and wherein the two lenses are separated by a distance that is approximately the sum of the focal lengths.

The one or more optical elements are configured to change the transverse spatial extent of the input beam such that the transverse spatial extent of the input beam incident on the spectrally dispersive element is larger than the transverse spatial extent of the input beam incident on the first reflective element.

The transverse spatial extent of the input beam incident on the spectrally dispersive element is at least about two times larger than the transverse spatial extent of the input beam incident on the first reflective element.

The spectrally dispersive element is configured to disperse the spectral components at the different respective angles from a common spatial mode.

The one or more optical elements are configured to expand the input beam provided to the spectrally dispersive element from a guided spatial mode of a waveguide to the common spatial mode incident on the spectrally dispersive element.

The first reflective element is configured to receive multiple input beams, and to tilt to select at least one and fewer than all of the dispersed spectral components of a given input beam to be directed to a corresponding selected output path.

In another aspect, in general, a method for spectrally filtering at least one input beam includes tilting a first reflective element to multiple tilt orientations that each corresponds to a different angle of propagation of at least one input beam. The method includes changing at least some of the relative angles of propagation of the input beam for different tilt orientations of the first reflective element. The method includes receiving the input beam at different respective locations for each of the tilt orientations, and dispersing spectral components of the input beam at different respective angles in a spectral plane. Tilting the first reflective element selects at least one and fewer than all of the dispersed spectral components to be directed to a selected output path.

In another aspect, in general, a system for monitoring spectra of spectral components of at least one input beam includes a first reflective element configured to tilt to multiple tilt orientations that each corresponds to a different angle of propagation of at least one input beam. The system includes one or more optical elements configured to change at least some of the relative angles of propagation of the input beam for different tilt orientations of the first reflective element. The system includes a spectrally dispersive element configured to receive the input beam at a location at which the central ray of the input beam is incident at different points on the spectrally dispersive element for each of the tilt orientations, and configured to disperse spectral components of the input beam at different respective angles in a spectral plane. The system includes at least one detector configured to receive at least one dispersed spectral component directed to a selected output path by the first reflective element.

Aspects can include one or more of the following features.

The detector is configured to measure one or more of wavelength, optical power, optical signal-to-noise ratio, bit rate, bit-error rate, and Q.

The system further includes a splitter to direct a first portion of a selected spectral component to a slow-speed detector that measures one or more of wavelength, optical power, and optical signal-to-noise ratio, and to direct a second portion of the selected spectral component to a high-speed detector that measures one or more of bit rate, bit-error rate, and Q.

Aspects can have one or more of the following advantages. It is understood that the following advantages are exemplary, and should not be construed as limitations on the invention. Certain advantages may or may not be present in any specific implementation.

Some characteristics of spectral filters and monitors include cost, size, spectral performance (e.g., resolution, filter shape, insertion loss, etc.), and reliability. In particular, some WDM systems are requiring significant reductions in cost and size without compromising on spectral performance and reliability. Some of the techniques described herein enable compact and low cost spectral filters and monitors that can maintain the spectral performance and reliability requirements.

One aspect of the spectral filtering apparatus is the use of non-imaging configurations of optical components. By employing non-imaging configurations of some examples described in more detail below, the optical path length can be reduced while maintaining the key optical performance advantages of imaging configurations.

Other features and advantages of the invention will become apparent from the following description, and from the claims.

DESCRIPTION OF DRAWINGS

FIG. 5C is a further schematic view of the exemplary spectrally adjustable filter of FIG. 5A.

DESCRIPTION

Figure 1A:
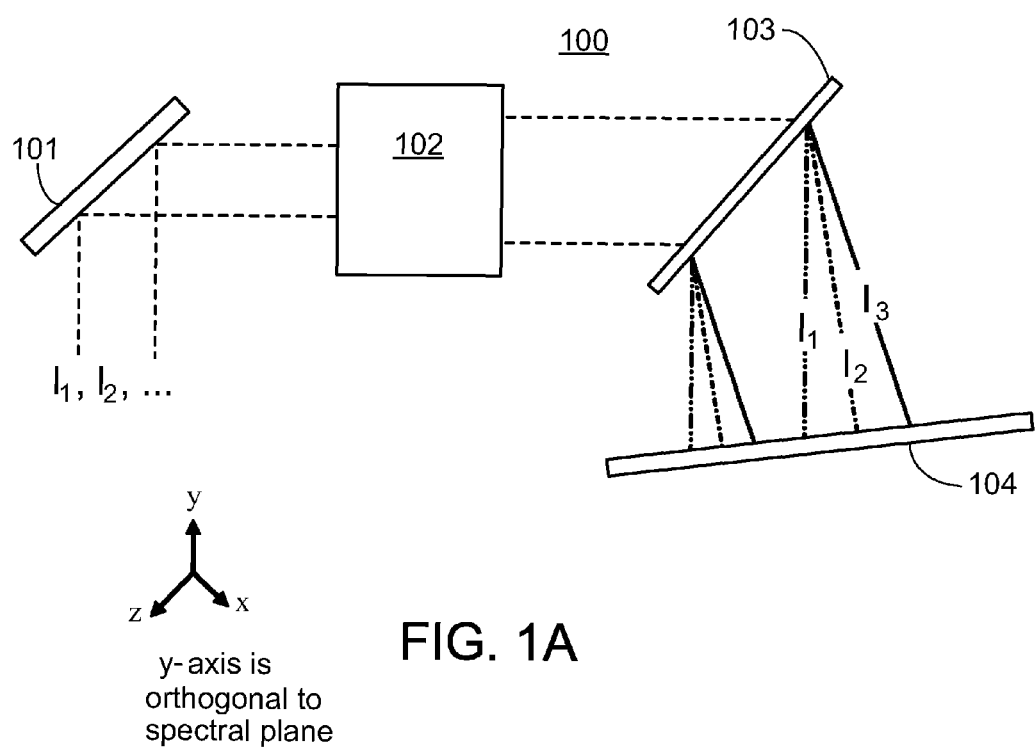
FIG. 1A is a schematic view of an exemplary spectrally adjustable filter.

A configuration 100 of a high resolution spectrally adjustable filter is shown in FIG. 1A. With reference to FIG. 1A, an input beam consisting of multiple spectral components, ($\lambda_1$, $\lambda_2$, . . . ), generally propagating together along a common propagation axis is incident on tiltable reflector 101. The input beam may have, for example, originated from an optical fiber or other confined waveguide such that the multiple spectral components are in a common spatial mode when they impinge on reflector 101. The input beam is reflected by tiltable reflector 101 and passes through one or more optical elements, shown schematically as optical elements 102 in FIG. 1A. After passing through the one or more optical elements 102, the input beam is incident on a spectrally dispersive element 103. The dispersive element 103 angularly disperses the constituent spectral components of the input beam such that different spectral components propagate along different propagation axes. The angles of the spectral components are dispersed within a plane, referred to herein for convenience as the "spectral plane." A reflector 104 is configured to receive at least some of the dispersed wavelengths and to reflect one or more spectral components back toward the spectrally dispersive element 103, such that the reflected spectral components are incident a second time on dispersive element 103. Accordingly, the different spectral components are further angularly dispersed relative to each other. That is, the angular separation between any two spectral components after being dispersed by dispersive element 103 on the return path is approximately twice the angular separation between the two spectral components after being dispersed by dispersive element 103 on the input path. A significant improvement in optical performance may be achieved by having the spectral components dispersed twice by dispersive element 103 in that the spectral resolution of the device may be approximately doubled.

Reflector 101 is tiltable about an axis perpendicular to the spectral plane, with the spectral plane being labeled in FIG. 1A as the x-z plane. The tiltable reflector 101 tilts to select at least one and fewer than all of the spectral components to be directed along a selected path, for example such that the return trip of the selected spectral components reflected by reflector 104 is incident on spectrally dispersive element 103, and to, for example, an output fiber, waveguide, and/or detector. It is understood that different spectral components may, when selected by tiltable mirror 101, traverse different selected paths upon reflection from mirror 101. This is a function of the different paths from which the various spectral components are incident on reflector 104, and may also be a function of different output locations for which the spectral components are intended.

The one or more optical elements 102 are configured to change the relative angles of propagation of the input beam in the x-z plane for different tilt orientations of the tiltable reflector 101. This change can be accomplished, for example, using one or more prisms and/or one or more lenses. Changing the relative angles of propagation of the input beam for different tilt orientations of tiltable reflector 101 translates into a corresponding change in the relative angle of incidence of the input beam onto different respective locations of dispersive element 103, and hence, for a given spectral component onto reflector 104. That is, for a dispersive element 103 such as a grating, a different input beam angle of incidence results in a different angle of propagation away from the grating for a given spectral component, as, for instance, governed by the grating equation. For example, in FIG. 1B, the angle of tiltable mirror 101 is rotated about the y-axis relative to its position in FIG. 1A such that the input beam angle of propagation after reflection from mirror 101 changes by a relative angle, $\theta_A$. Optical elements 102 are configured such that the corresponding change in the relative input angle after passing through optical elements 102 is $\theta_B$ which correlates to a relative change of $\theta_C$ in the angle of incidence of spectral component $\lambda_1$ onto reflector 104. Accordingly, the one or more optical elements 102 can be configured to change the relative angles of incidence of the selected spectral components onto reflector 104 for different tilt orientations of tiltable reflector 101 as appropriate for the filter implementation.

Figure 1B:
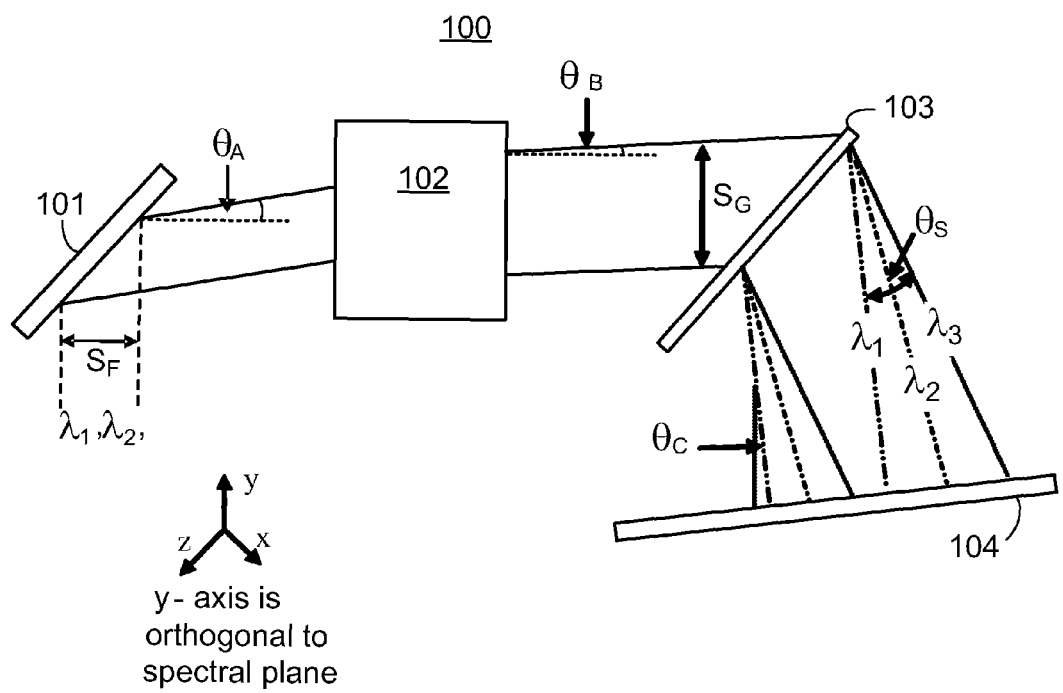
FIG. 1B is another schematic view of the exemplary spectrally adjustable filter of FIG. 1A.
Figure 1C:
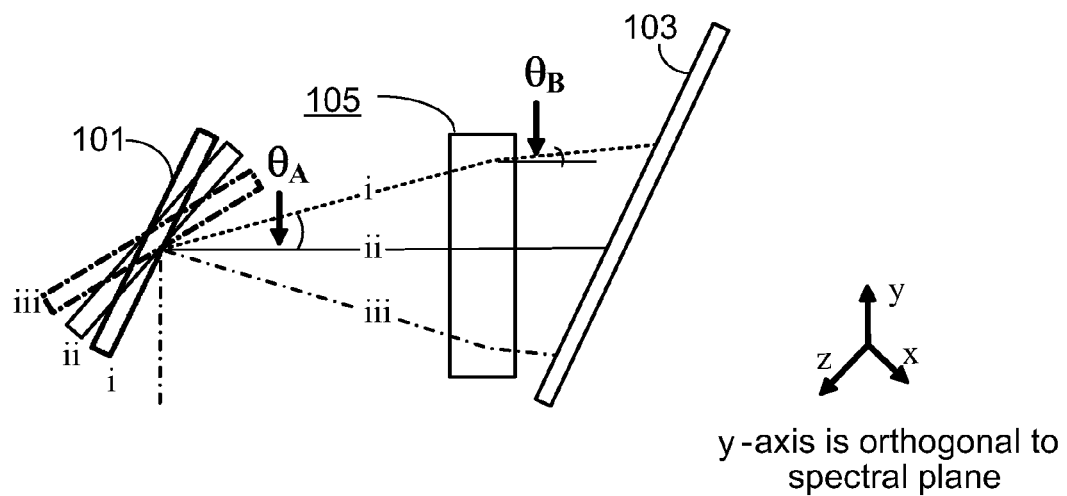
FIG. 1C is a further schematic view of the exemplary spectrally adjustable filter of FIG. 1A.
Figure 1D:
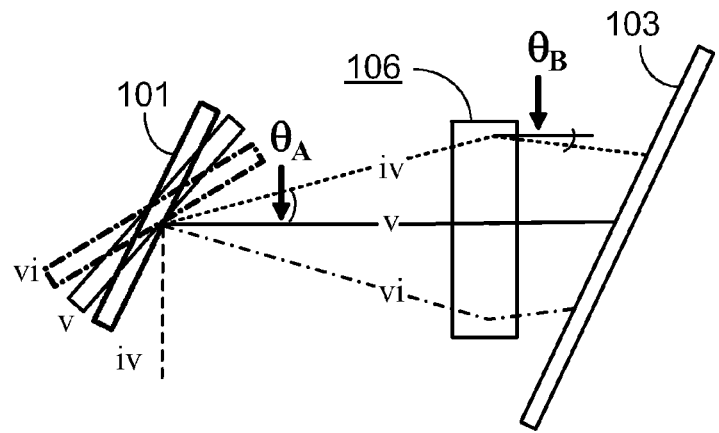
FIG. 1D is a further schematic view of the exemplary spectrally adjustable filter of FIG. 1A.

For example, in some filter implementations, the maximum angular separation between spectral components to be selected, $\theta_S$, after the spectrally dispersive element may be too large for a tilt range of the tiltable reflector 101. In such an implementation, the maximum relative angular change $\theta_B$ after the optical elements 102, may be increased to enable the tilt range of mirror 102 to map to a maximum relative change in the incidence angle, $\theta_C$, of spectral components onto reflector 104 that is greater than or equal to $\theta_S$. Alternatively, in some filter implementations, the maximum angular separation $\theta_B$ after the optical elements 102 may be reduced (up to an available tilt range of mirror 102) to improve the spectral resolution of the filter, as explained in more detail below. FIG. 1C and FIG. 1D show the relative changes in the input beam propagation for several tilt orientations (i.e. i, ii, iii) of tiltable mirror 101 and for different implementation of optical elements 105 and 106, respectively. As shown in FIG. 1C and FIG. 1D, in which only the central ray of the input beam is drawn, some implementations may provide relative changes to the input beam angle that are diverging after optical elements 105, and some implementations may provide input beams that are converging after optical elements 106. It is understood that in both types of implementations, the maximum relative angular changes $\theta_B$ and $\theta_C$ may be measured as defined above.

The one or more optical elements 102 also provide the ability to change the transverse spatial extent (as utilized herein, the $1/e^2$ beam diameter) of the input beam. In some implementations, it is useful to be able to have a large beam illuminating the spectrally dispersive element 103, such as a grating (e.g., a transmissive or reflective diffraction grating). The optical elements 102 may enable the input beam to have a smaller transverse spatial extent at the tiltable reflector 101, such as a MEMs analog tilt mirror, than the transverse spatial extent of the input beam at the spectrally dispersive element 103. This may be important in practical devices since highly reliable MEMs mirrors suitable for telecommunications systems typically have reflective surfaces smaller in dimension (e.g., diameter) than the preferred beam size at the dispersive grating for high spectral resolution. In FIG. 1B, for example, the transverse spatial extent of the input beam incident on the tiltable reflector 101 is given by $S_F$. The transverse spatial extent of the input beam after passing through optical elements 102 and incident on dispersive element 103 is given by $S_F$ and is larger than $S_G$.

Figure 1E:
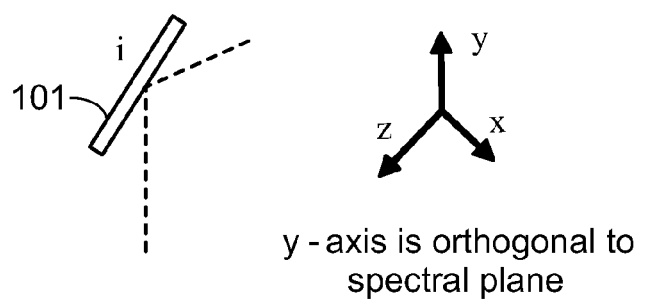
FIGS. 1E, 1F, and 1G are further schematic views of the exemplary spectrally adjustable filter of FIG. 1A.
Figure 1F:
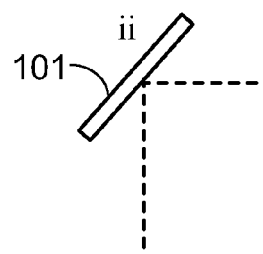
Figure 1G:
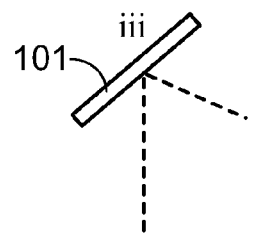
Figure 1H:
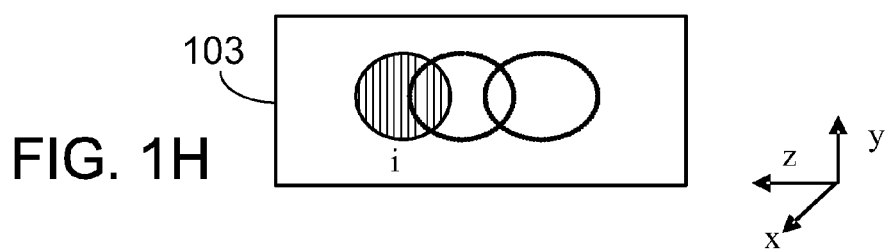
FIGS. 1H, 1I, and 1J are further schematic views of the exemplary spectrally adjustable filter of FIG. 1A.
Figure 1I:
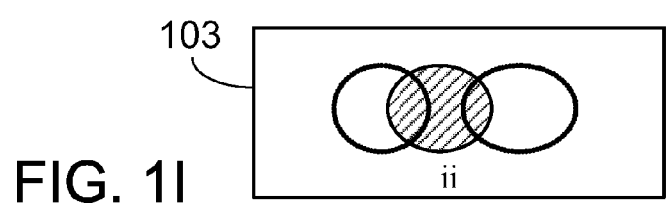
Figure 1J:
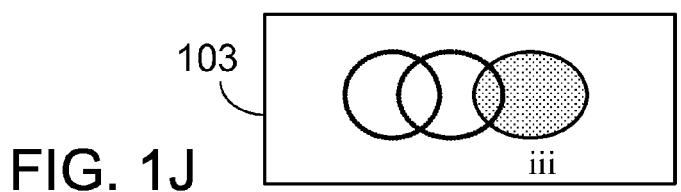

FIGS. 1E, 1F, and 1G show an example of the propagation of the central ray of the input beam for three different orientations of the tiltable reflector 101 and FIGS. 1H, 1I, and 1J show an example of the corresponding input beam profiles on the surface of the dispersive element 103. The input beam profile for a given mirror 101 tilt orientation (i.e. i, ii, iii) is displayed a filled-in oval/circle. The outlined open ovals/circles represent the input beam profiles for the two other mirror 101 tilt orientations for reference. In the illustrative example, for different tilt orientations of mirror 101 the center or central ray of the input beam is incident at different points on dispersive element 103. It is understood that the phrase "incident at different points" as used herein is construed broadly, to encompass not only situations where no mirror 101 tilt orientation has an input beam incident at substantially the same point as the input beam from any other mirror 101 tilt orientation, but also encompasses situations where one or more of the mirror 101 tilt orientations result in input beams that are incident at substantially one point, and one or more other mirror 101 tilt orientations result in input beams that are incident at another point or substantially at that other point. It is further understood that when the central rays of input beams for different mirror 101 tilt orientations are incident at different points, as described herein, that there may be overlap between and among the input beam profiles through their transverse spatial extent, as is the case in the exemplary orientations shown in FIGS. 1H, 1I, and 1J.

Figure 1K:
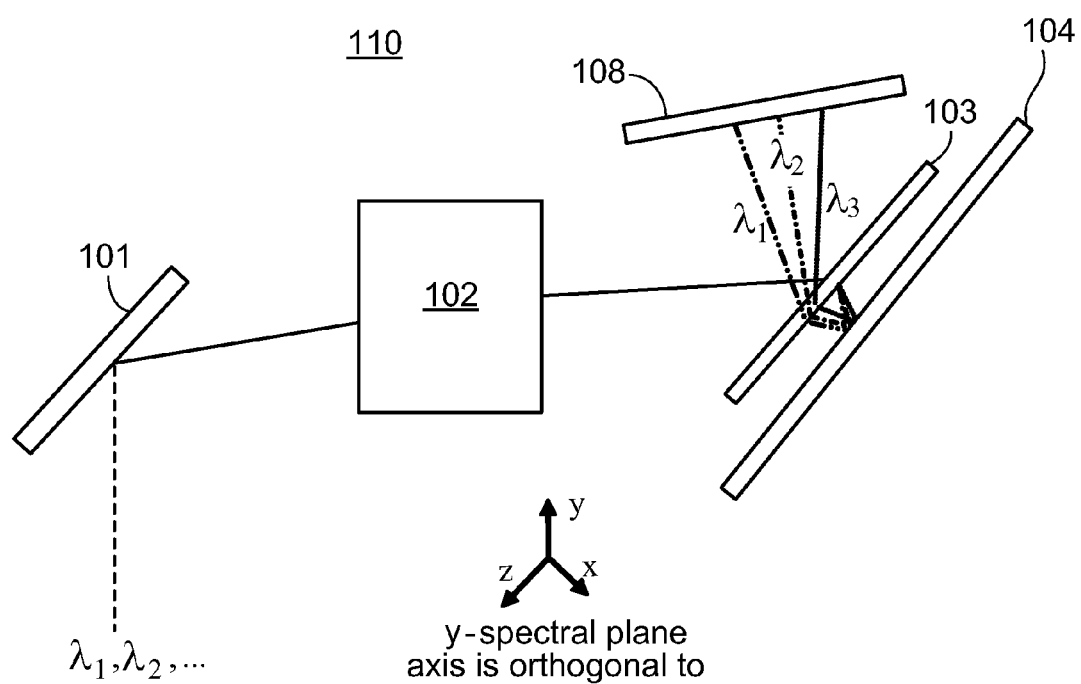
FIG. 1K is a schematic view of another exemplary spectrally adjustable filter.

A further significant improvement in optical performance may be achieved by having the spectral components dispersed four times by dispersive element 103 in that the spectral resolution of the device may be approximately quadrupled relative to a device in which spectral components are dispersed only once by the dipersive element. An exemplary configuration for the spectral components passing four times through dispersive element 103 is shown in FIG. 1K. With reference to FIG. 1K, the reflector 104 is oriented to reflect the dispersed spectral components back through the dispersive element 103 and toward another reflector 108, such that the spectral components are incident a second time on dispersive element 103. Reflector 104 is configured to receive at least some of the dispersed wavelengths and to reflect one or more spectral components back toward the spectrally dispersive element 103, such that the reflected spectral components are incident a third and fourth time on dispersive element 103. Accordingly, the different spectral components are further angularly dispersed relative to each other. That is, the angular separation between any two spectral components after being dispersed by dispersive element 103 on the return path is approximately four times the angular separation between the two spectral components after being dispersed by dispersive element 103 on the first pass through dispersive element 103. In other exemplary configurations (not shown), more passes, for example 6 passes or 8 passes, of the selected spectral components through the dispersive element may be achieved by reflecting the selected spectral components back and forth through the dispersive element at different positions along the axis perpendicular to the spectral plane.

It is understood that an input beam or spectral component may be "incident" or "received" on a reflector or element if not all of the power of the beam or component falls on the reflector or element. Only a useful portion of the input beam or spectral component need be incident or received on the reflector or element.

Figure 2A:
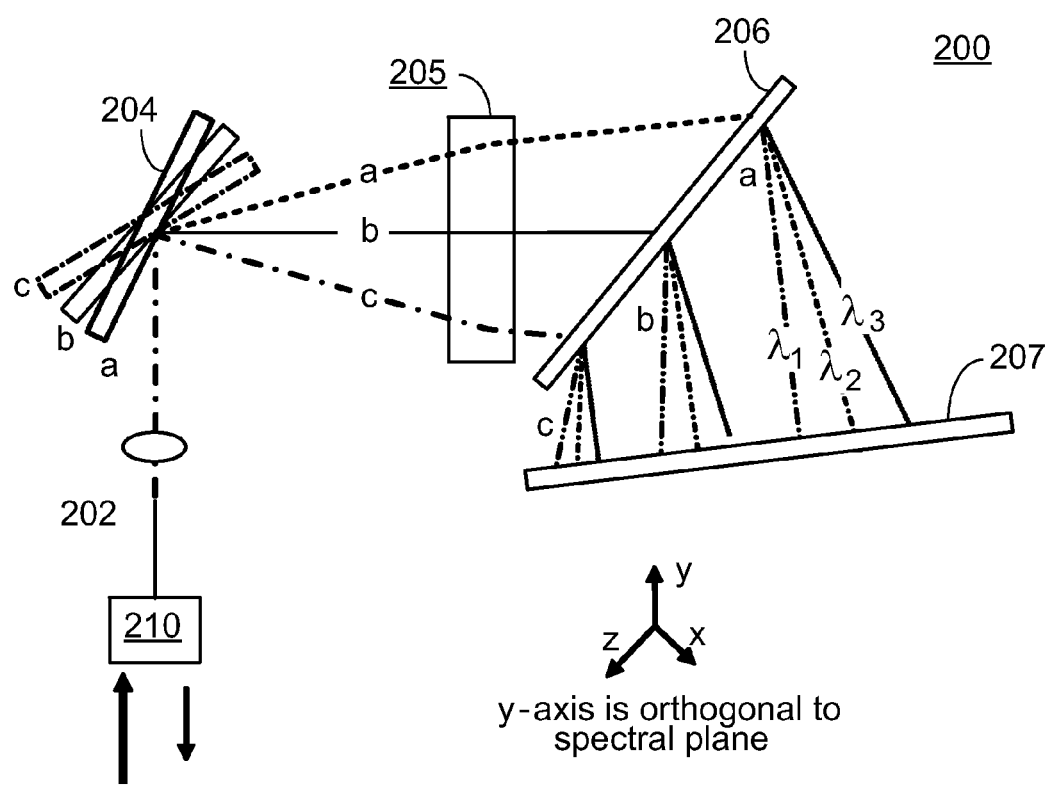
FIG. 2A is a schematic view of another exemplary spectrally adjustable filter.
Figure 2B:
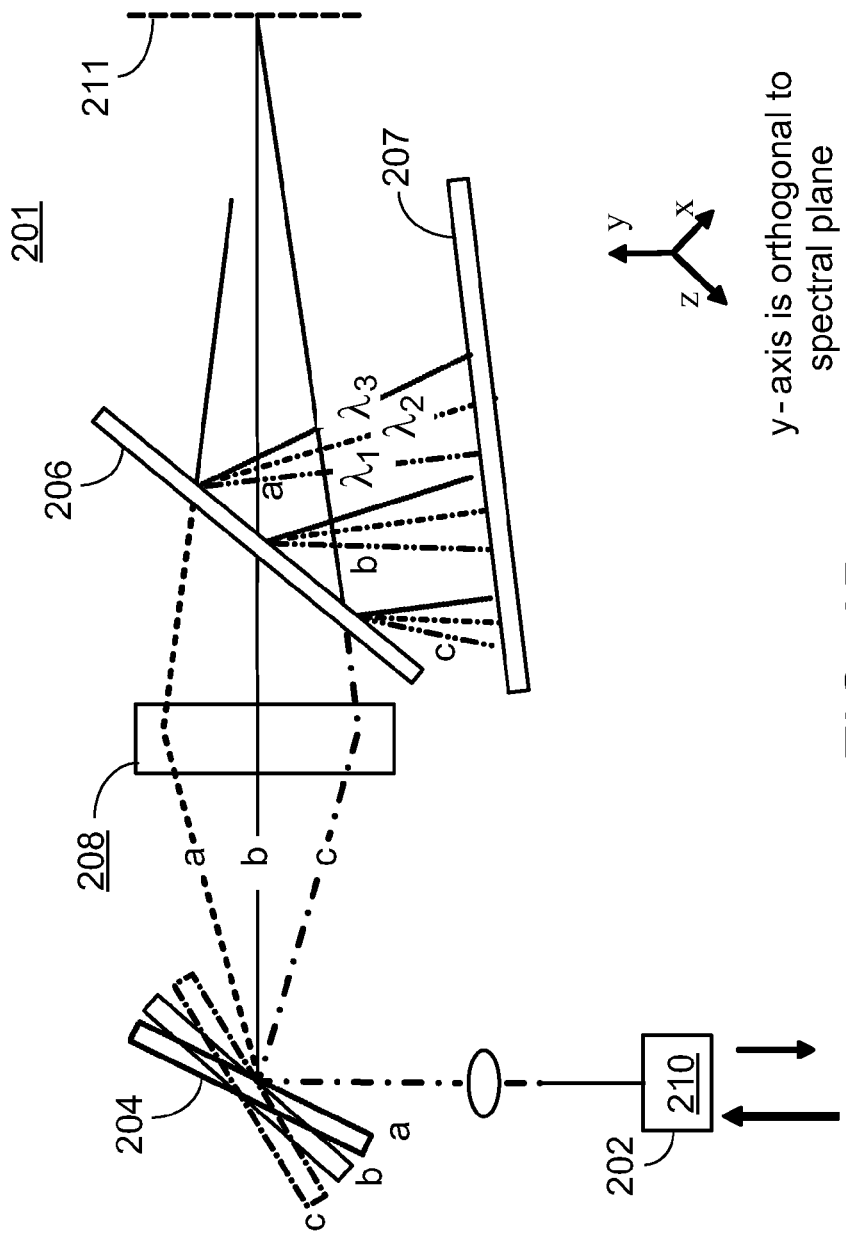
FIG. 2B is a schematic view of another exemplary spectrally adjustable filter.

Referring to FIGS. 2A and 2B, exemplary spectrally adjustable filter devices 200 and 201 include a tiltable reflector 204 that receives an input beam having multiple spectral components propagating together along a common propagation axis from an input spatial mode. In this example, the input spatial mode is defined by a waveguide 202 (e.g., an optical fiber). The tiltable reflector 204 reflects the input beam at different angles for different tilt orientations (a, b, c) such that the input beam is incident at different points and at different incidence angles on dispersive element 206. Thus, the spectral components, having different peak wavelengths, are dispersed such that the angles of their respective propagation axes are different for the different mirror 204 tilt orientations. The angles of the spectral components are dispersed within the spectral plane, which is the x-z plane in FIGS. 2A and 2B. This angular dispersion produces spatial dispersion as the spectral components propagate away from the element 206. FIGS. 2A and 2B show views of the spectral components being dispersed in the spectral plane for the different mirror 204 tilt orientations (a, b, c). For clarity, only the forward direction of propagation of the central ray of the input beam each spectral component is shown.

In the illustrated examples, the devices 200 and 201 include one or more optical elements, shown schematically as 205 (FIG. 2A) and 208 (FIG. 2B), configured to change the angle of the propagation axis of the input beam for different tilt orientations of tiltable reflector 204. (It is understood that the term "optical elements" may be used herein to refer to a single element or multiple elements.)

For these examples, the different input beam propagation paths do not converge to a point or substantially to a point on dispersive element 206. Referring to FIG. 2A, such a convergence does not take place since the input beam paths are diverging. Having the different input beam propagation paths converge to a point or substantially to a point would necessitate moving the dispersive element 206 further away from the optical elements 208 and, hence, would increase the optical path length. Such an increase in length could be disadvantageous, particularly in implementations in which a compact device is preferred or required.

Referring to FIG. 2B, in an analogous imaging configuration, the origination of the different input beam propagation paths at tiltable reflector 204 would be imaged to a point at an image plane 211, and the dispersive element 206 would be placed at that location, resulting in an excessively long path length. Such imaging configurations would typically be used, for example, to provide a fixed input beam on a dispersive element such as a grating as the filter is tuned. However, by allowing the input beam to vary over the surface of the dispersive element in a non-imaging configuration, the spectral filter in the example of FIG. 2A avoids the length requirements of such imaging configurations.

In the configuration for a spectral filter in the example of FIG. 2A, instead of imaging points at a source location to respective points in an image plane, the optical elements 208 function to change the propagation axis and beam profile of input beam for different mirror 204 tilt orientations. The dispersive element 206 may receive the input beams corresponding for the different mirror 204 tilt orientations at a location at which the central rays of the input beams are incident at different points on dispersive element 208 (rather than converging to substantially the same point on dispersive element 208, as in an analogous imaging system). Therefore, the dispersive element 208 can be placed close to the optical elements 208 and a device can have a compact path.

In the illustrated example, all or substantially all of the spectral components are received by (i.e., incident on) the reflector 207. In other examples, a smaller subset of the dispersed spectral components from a given input beam may be received by the reflective surface of reflector 207. The tiltable reflector 204 is preferably configured to tilt (e.g., on a rotation stage) about the axis perpendicular to the spectral plane, although another axis or combination of axes could be selected if useful. The preferred tilt axis may be referred to herein as the y-axis, although, it is understood that any nomenclature for such axis or other axis is for convenience and clarity only, and should not be construed as a limitation.

Since the spectral components generally arrive at the surface of the reflector 207 at different angles of incidence for different mirror 204 tilt orientations, tilting the mirror 204 selects one of the dispersed spectral components to be directed to a selected output path. A given angle of incidence at reflector 207 corresponds to a specific spectral component that is to be directed to its selected output path. In the device 200, the selected output path returns the spectral components to the input spatial mode defined by the waveguide 204 (where a "spatial mode" refers to the transverse spatial profile of a beam and not its direction of propagation). In this configuration, the selected spectral component is retro-reflected back to the spectrally dispersive element along substantially the same angle in both the spectral plane and the orthogonal y-z plane at which the selected spectral component was dispersed. Accordingly, the selected spectral component propagates back to the optical elements 205 and tiltable mirror 204 along substantially the same path as the input beam such that a coupler 210 may be used to couple the input beam into the waveguide 204, and to couple the selected output spectral component from the waveguide 204. In this example, spectral components that are not substantially retro-reflected by reflector 208 do not propagate back along their incident paths and do not get substantially coupled back into waveguide 204. In many spectrally adjustable filter applications, low insertion loss is an important optical performance parameter. Accordingly, the coupler 210 could be replaced by a circulator, for example, to provide lower insertion loss. In the configurations of devices 200 and 201, it may be advantageous, for the reduction of polarization dependence, to place a quarter waveplate between the dispersive element 206 and reflector 207, such that its surface is approximately perpendicular to the direction of propagation of the selected spectral components and with its principle axis at 45 degrees relative to the y-axis.

Various types of optical elements can be used to change the angles and transverse spatial extent as described above. One example shown below uses a prism and another example uses two prisms. A further example shown below uses one or more lenses in a non-imaging configuration. Other examples may utilize one or more prisms and one or more lenses.

The spectral filter can be included in an optical spectrum monitor that includes one or more detectors at the output paths to receive at least a portion of a selected spectral component. In some implementations, a splitter may be used to direct a first portion of a spectral component to a slow-speed detector that measures one or more parameters such as wavelength, optical power, and optical signal-to-noise ratio, and/or to direct a second portion of the spectral component to a high-speed detector that measures one or more bit rate dependent parameters such as bit rate, bit-error rate, and Q (e.g., from an eye diagram).

Part or all of the filtered output signal in an optical spectrum monitor may be directed to output paths that detect distinct polarization states. Placing different polarizers preceding different detectors, and directing the filtered output to the detectors may enable the analysis of the polarization state of the spectral components in the WDM input signal.

Additional Exemplary Filter Configurations

Figure 3A:
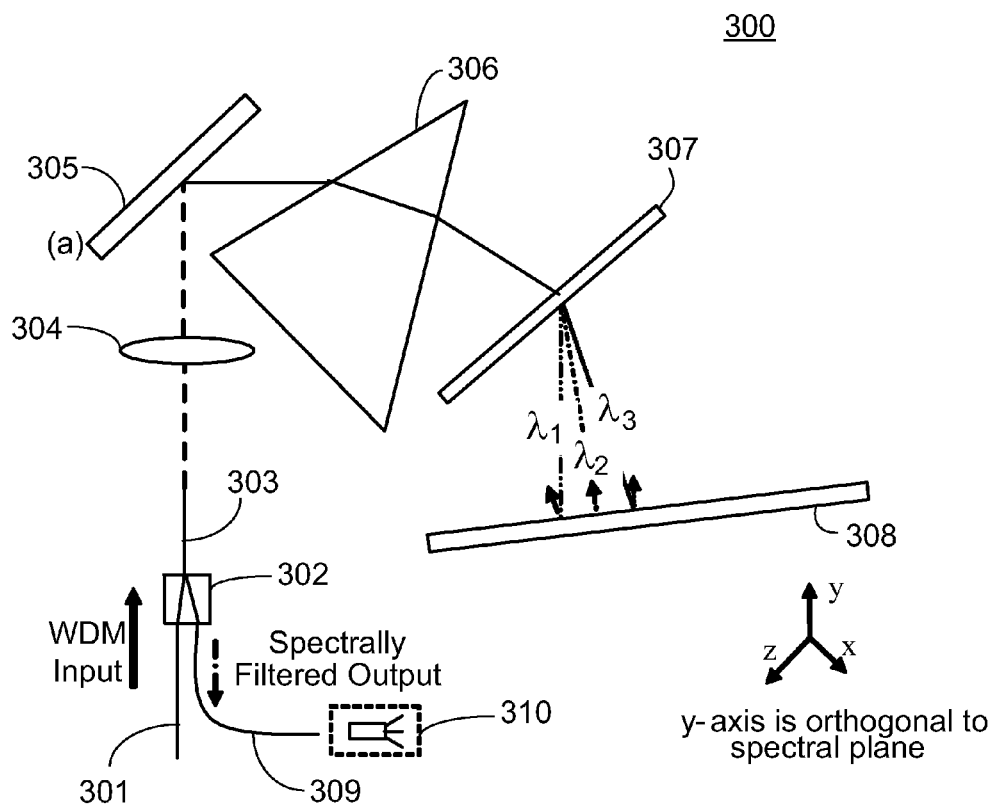
FIG. 3A is a schematic view of another exemplary spectrally adjustable filter.
Figure 3B:
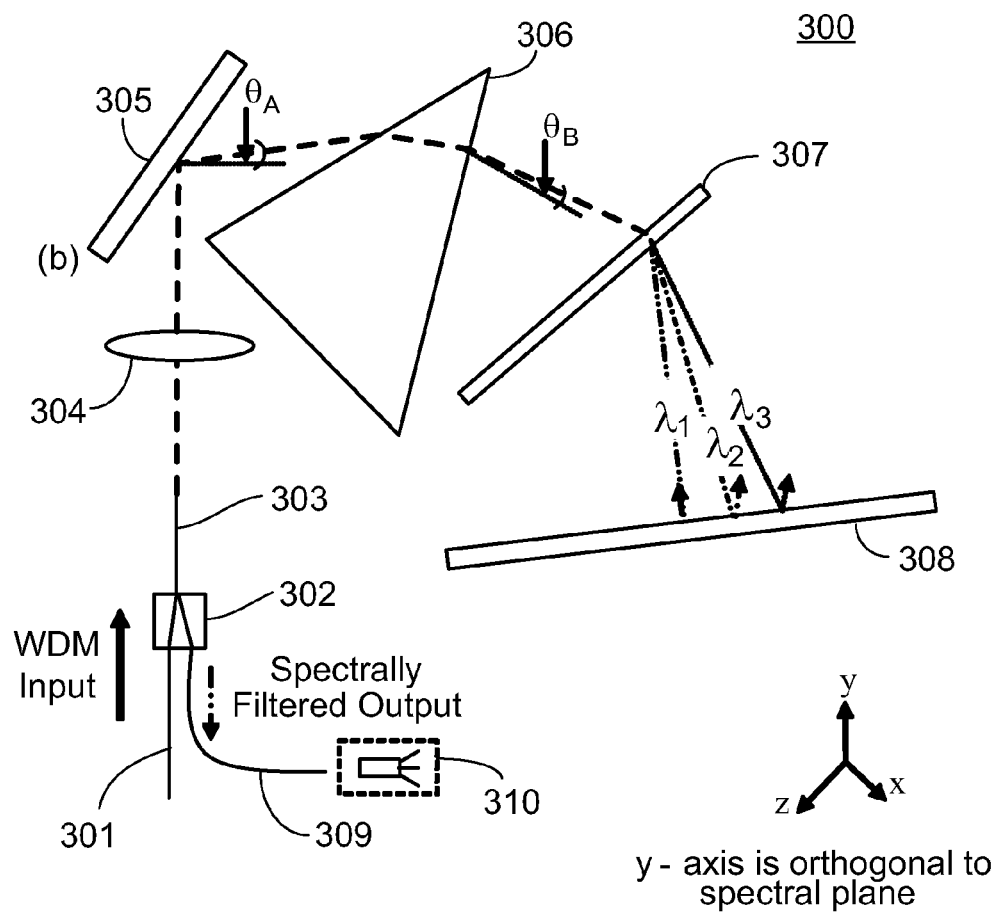
FIG. 3B is a further schematic view of the exemplary spectrally adjustable filter of FIG. 3A.
Figure 3C:
FIG. 3C is a schematic view of different input beams of the exemplary spectrally adjustable filter of FIG. 3A.
Figure 3C:
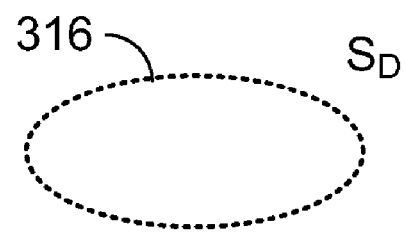

In another exemplary configuration, shown in FIGS. 3A, 3B, and 3C, an anamorphic prism 306 is used as the optical element configured to change the relative angles of propagation of the input beam in the x-z plane for different tilt orientations of the tiltable mirror 305. For clarity, in FIGS. 3A and 3B only the forward direction of propagation and the initial return path directions of the spectral components are drawn. Also for clarity, FIGS. 3A and 3B show only the central rays of the spectral components.

With reference to FIG. 3A, an exemplary device 300 includes a device input fiber 301, a fiber coupler 302, an input/output fiber 303, an input/output lens 304, and a tiltable mirror 305. In this configuration, the input beam passes through a prism 306 before impinging on dispersive grating 307. The grating 307 disperses the input beam into its spectral components (e.g. $\lambda_1, \lambda_2, \lambda_3, \ldots$) which are then incident on reflector 308. The tilt mirror 305 is actuated about the y-axis to selectively direct spectral components along selected output paths, for example back along their incident paths. Spectral components that are directed back along their incident paths may be coupled into input/output fiber 303, and then directed by coupler 302 to a device output fiber 309. Accordingly, spectral components that are not directed by mirror 305 back along their incident paths might not be coupled back into input/output fiber 303 and, if not coupled, will not be present in the filtered output signal of the device. Optionally, a detection element 310 may be placed at a useful location, for example at the exit of the device output fiber 309, to detect the filtered output. As such, by actuation of mirror 305 and by measuring the detector 310 signal (e.g. current or voltage), the spectral components of the input WDM signal can be discerned. In FIG. 3A, tiltable mirror 305 is actuated about the y-axis to an orientation (a) such that spectral component $\lambda_2$ is reflected by reflector 308 back along its incident path such that it may be coupled into input/output fiber 303, and then directed by coupler 302 to device output fiber 309. For the same tiltable mirror 305 orientation (a), spectral components $\lambda_2$ and $\lambda_3$ are not reflected back along their incident paths and, accordingly, may not be coupled into input/output fiber 303 and may not be present in device output fiber 309. In FIG. 3B. tiltable mirror 305 is actuated about the y-axis to a second orientation (b) such that spectral component $\lambda_1$ is reflected by reflector 308 back along its incident path such that it may be coupled into input/output fiber 303, and then directed by coupler 302 to device output fiber 309. For the same second tiltable mirror 305 orientation (b), spectral components $\lambda_1$ and $\lambda_3$ are not reflected back along their incident paths and, accordingly, may not be coupled into input/output fiber 303 and may not be present in device output fiber 309.

Importantly for this example, the elements of exemplary device 300 are placed in a non-imaging configuration, wherein the different input beam propagation paths do not converge to a point or substantially to a point at dispersive element 206. In this illustrative example, the divergence of the relative angles of propagation of the different input beam propagation paths for different mirror 305 tilt orientations are decreased by prism 306 (i.e. $\theta_B < \theta_A$). Additionally, prism 306 may act to increase the input beam diameter prior to its impingement on dispersive grating 307. FIG. 3C shows an example of an input beam diameter 315 ($S_C$) as it impinges on tiltable mirror 305 and the input beam diameter 316 ($S_D$) after the input beam passes through prism 306 and as it is incident on grating 307. As shown, the spatial extent of the input beam at grating 307 may be greater than the spatial extent of input beam at mirror 305 (i.e. $S_D > S_C$).

Advantages of the configuration of device 300 may include a short optical path length, the ability to control angular magnification/de-magnification of relative input beam propagation angles for different mirror 305 tilt orientations about the y-axis (e.g. to match the relative propagation angles of spectral components dispersed by grating 307 to the available tilt range of tilt mirror 305), the ability to control the spatial extent of the input beams via beam magnification/de-magnification (e.g. to enable a large beam on grating 307 and smaller beam on the mirror 305), and the reduction in component size/count and cost. In other words, device 300 may maintain the potential spectral performance benefits of an imaging configuration but at a reduced cost and reduced size. Further, by configuring the selected spectral components to pass back through the dispersive grating 307 (i.e. a second pass), the spectral resolution of device 300 may be doubled relative to a single pass configuration.

Figure 4A:
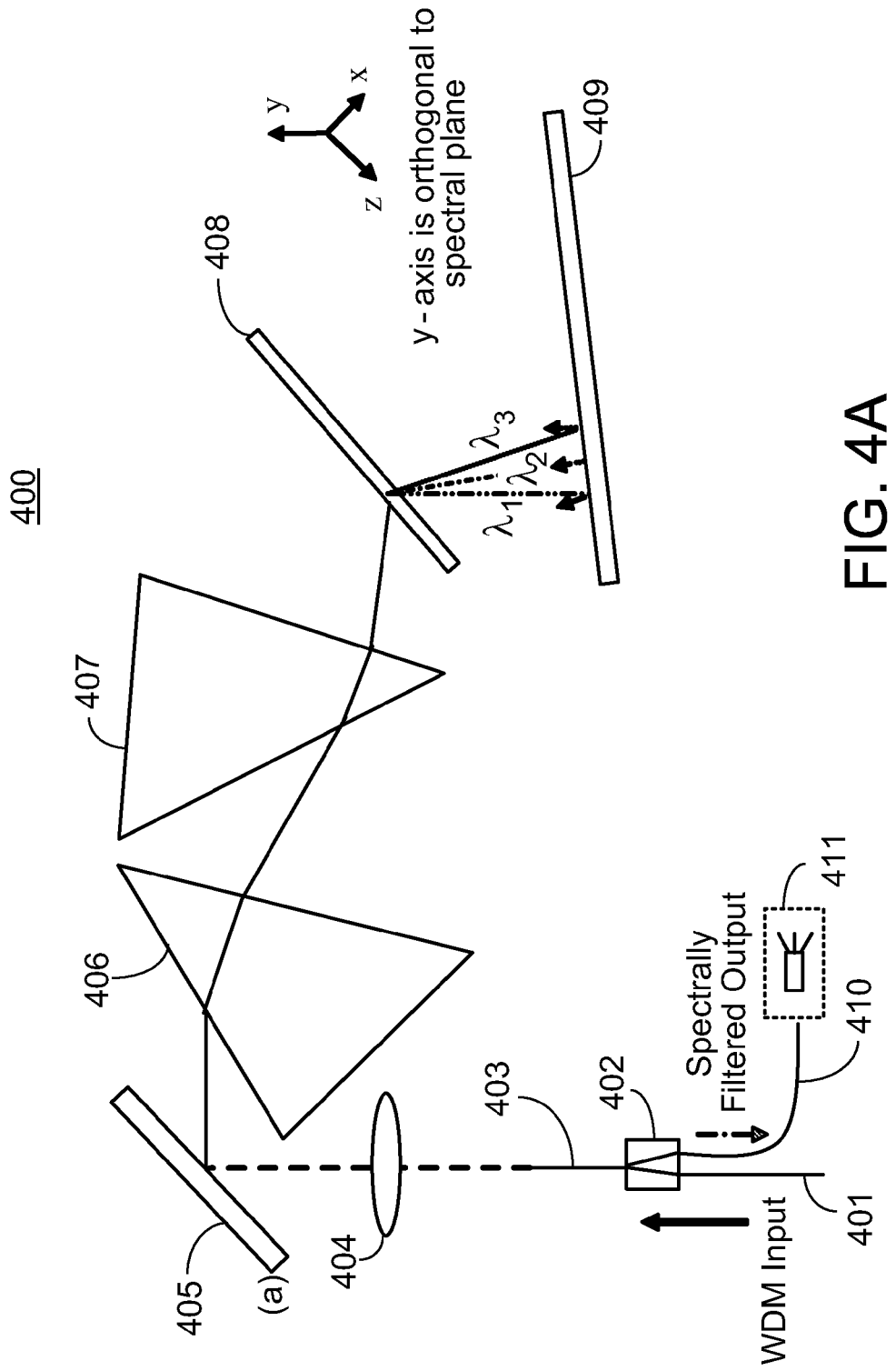
FIG. 4A is a schematic view of another exemplary spectrally adjustable filter.
Figure 4B:
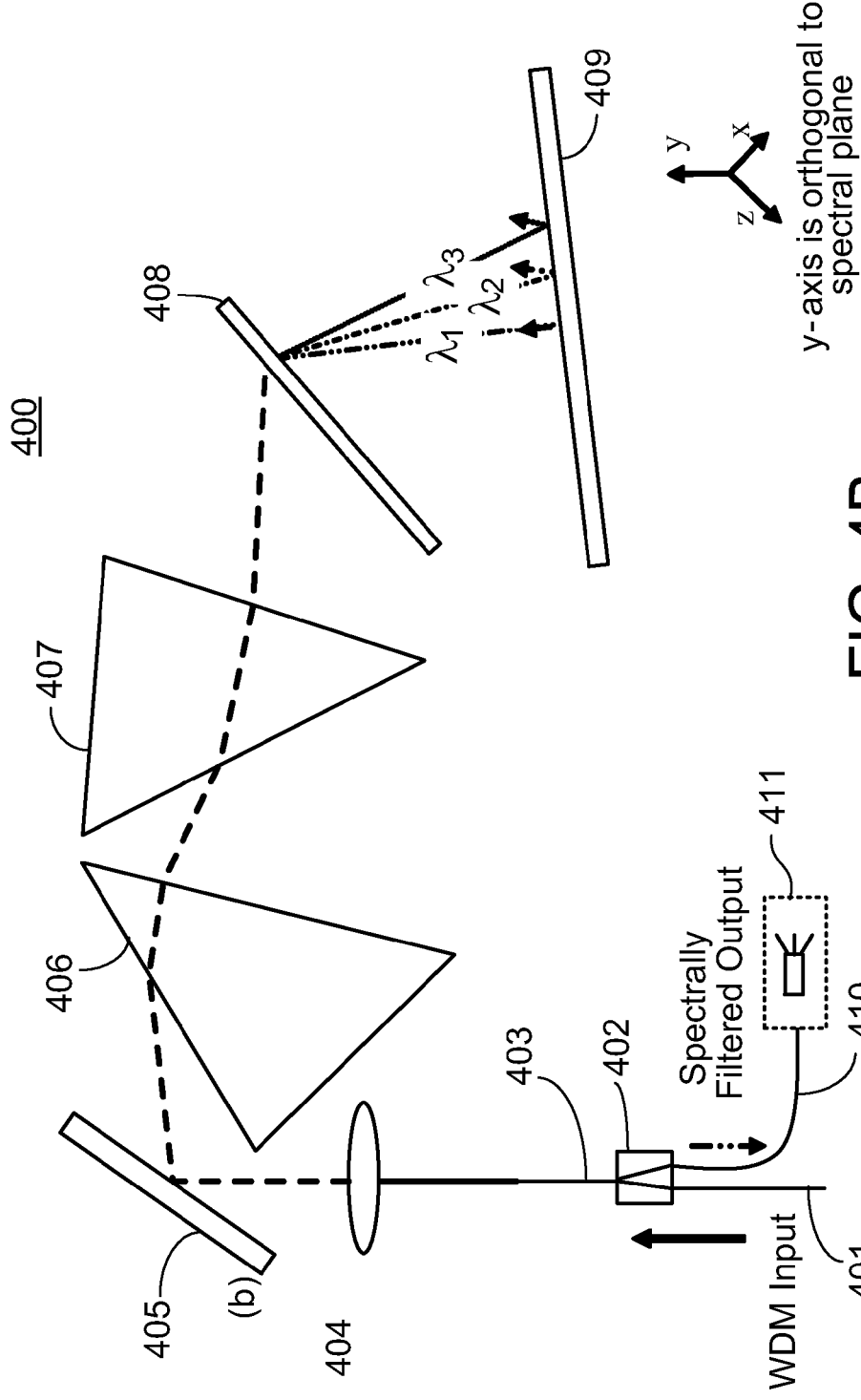
FIG. 4B is another schematic view of the exemplary spectrally adjustable filter of FIG. 4A.

In another exemplary configuration, shown in FIGS. 4A and 4B two anamorphic prisms 406 and 407 are used as the optical elements configured to change the relative angles of propagation of the input beam in the x-z plane for different tilt orientations of the tiltable mirror 405. For clarity, in FIGS. 4A and 4B only the forward direction of propagation and the initial return path directions of the spectral components are drawn. Also for clarity, FIGS. 4A and 4B show only the central rays of the spectral components.

With reference to FIG. 4A, an exemplary device 400 includes a device input fiber 401, a fiber coupler 402, an input/output fiber 403, an input/output lens 404, and a tiltable mirror 405. In this configuration, the input beam passes through prism 406 and prism 407 before impinging on dispersive grating 408. The grating 408 disperses the input beam into its spectral components (e.g. $\lambda_1, \lambda_2, \lambda_3, \ldots$) which are then incident on reflector 409. The tilt mirror 405 is actuated about the y-axis to selectively direct spectral components along selected output paths, for example back along their incident paths. Spectral components that are directed back along their incident paths may be coupled into input/output fiber 403, and then directed by coupler 402 to a device output fiber 410. Accordingly, spectral components that are not directed by mirror 405 back along their incident paths might not be coupled back into input/output fiber 403 and, if not coupled, will not be present in the filtered output signal of the device. Optionally, a detection element 411 may be placed at a useful location, for example at the exit of the device output fiber 410, to detect the filtered output. As such, by actuation of mirror 405 and by measuring the detector 411 signal (e.g. current or voltage), the spectral components of the input WDM signal can be discerned. In FIG. 4A, tiltable mirror 405 is actuated about the y-axis to an orientation (a) such that spectral component $\lambda_2$ is reflected by reflector 409 back along its incident path such that it may be coupled into input/output fiber 403, and then directed by coupler 402 to device output fiber 410. For the same tiltable mirror 405 orientation (a), spectral components $\lambda_2$ and $\lambda_3$ are not reflected back along their incident paths and, accordingly, may not be coupled into input/output fiber 403 and may not be present in device output fiber 410. In FIG. 4B. tiltable mirror 405 is actuated about the y-axis to a second orientation (b) such that spectral component $\lambda_1$ is reflected by reflector 409 back along its incident path such that it may be coupled into input/output fiber 403, and then directed by coupler 402 to device output fiber 410. For the same second tiltable mirror 405 orientation (b), spectral components $\lambda_1$ and $\lambda_3$ are not reflected back along their incident paths and, accordingly, may not be coupled into input/output fiber 403 and may not be present in device output fiber 409.

Advantages of the configuration of device 400 that utilizes an anamorphic prism pair (prisms 406 and 407) over and above those for a device employing a single prism may include an increased ability to control angular magnification/de-magnification of relative input beam propagation angles for different mirror 405 tilt orientations about the y-axis (e.g. to match the relative propagation angles of spectral components dispersed by grating 408 to the available tilt range of tilt mirror 405) and an increased ability to control the spatial extent of the input beams via beam magnification/de-magnification (e.g. to enable a large beam on grating 408 and smaller beam on the mirror 405). Further, different input beam incidence angles on prism 406 may result in different input beam diameters at the output of prism 406. By configuring prism 407 as in the example of FIG. 4A and FIG. 4B, the incidence angle of the input beam relative to the surface incident surface of prism 407 decreases for input beams that have an increased angle of incidence on prism 406. Accordingly, the input beam diameter at the exit of prism 407 for different input beam incidence angles at prism 406 (i.e. for different mirror 405 tilt orientations about the y-axis) changes relatively less as a function of the input beam incidence angle at prism 406 than the input beam diameter at the exit of prism 406. Accordingly, device 400 may have a more uniform spectral filtering resolution across the spectral range since the spectral resolution may be dependent on the input beam diameter at the grating 409. Further uniformity of spectral filtering resolution across the spectral range may be achieved by proper design of the relative input beam incidence angles at prisms 406 and 407. A third anamorphic prism (not shown) placed between prism 407 and grating 408 may be oriented to further improve the uniformity of spectral filtering resolution across the spectral range.

A potential advantage of the exemplary configurations of FIGS. 3 and 4, in which prisms are utilized as the one or more optical elements configured to change the relative angles of propagation of the input beam for different tilt orientations of the tiltable reflectors 305 and 405, respectively, is that the prisms substantially preserve collimation of beams (e.g., approximately collimated such that the beam radius does not vary by more than 40%) over the entire propagation path so neither the input beam nor the return spectral components are focused along the optical path in between the input/output lenses, 304 and 404, respectively. Accordingly, there is no critical positioning of the components in terms of distance along the propagation path. Further, since there is no focusing along said path, there are no aberration effects that may degrade the spectral resolution of the device. Focusing elements may be designed to eliminate aberration effects, but there is almost always a high associated cost for such components. An embodiment employing lenses is described below that may mitigate some of the disadvantages of having focusing elements in the optical path.

Figure 5A:
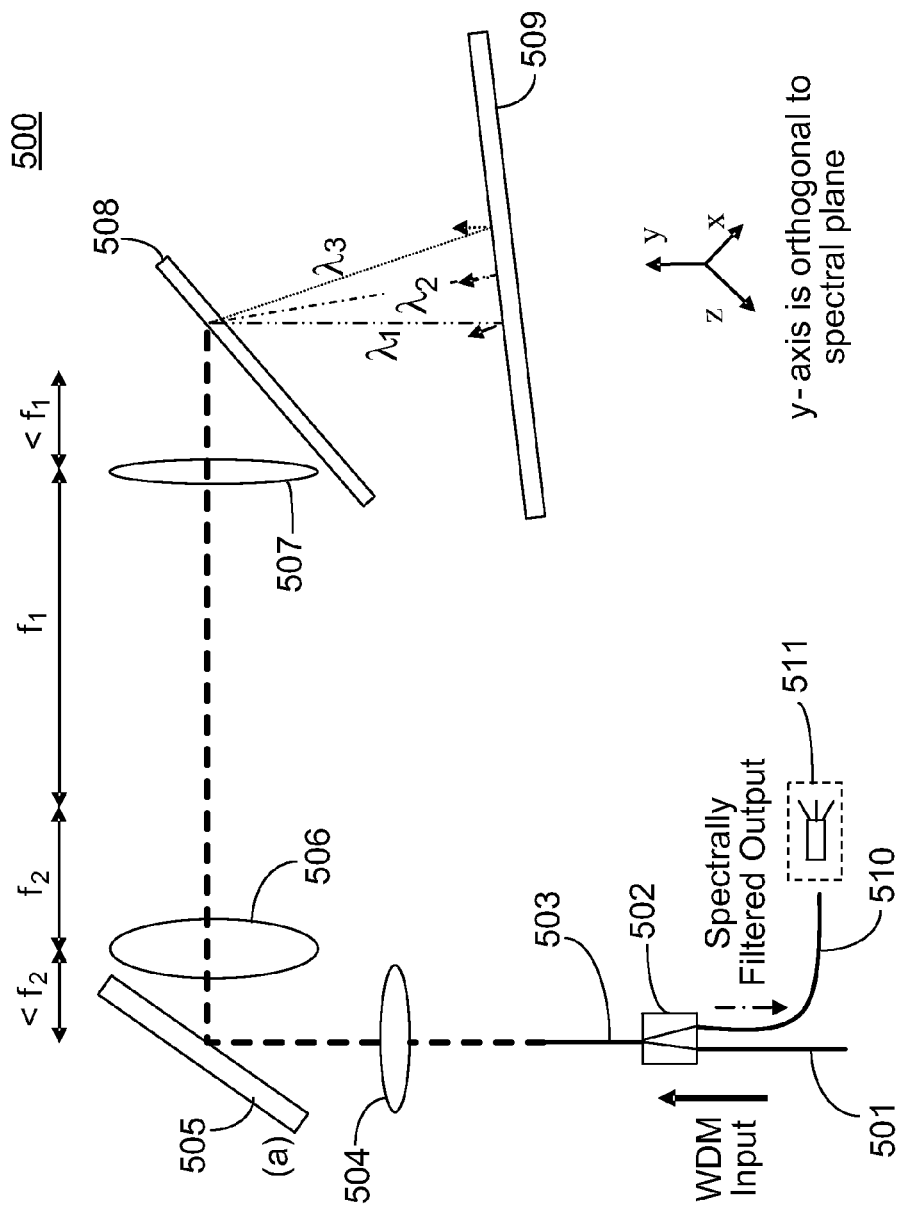
FIG. 5A is a schematic view of another exemplary spectrally adjustable filter.
Figure 5B:
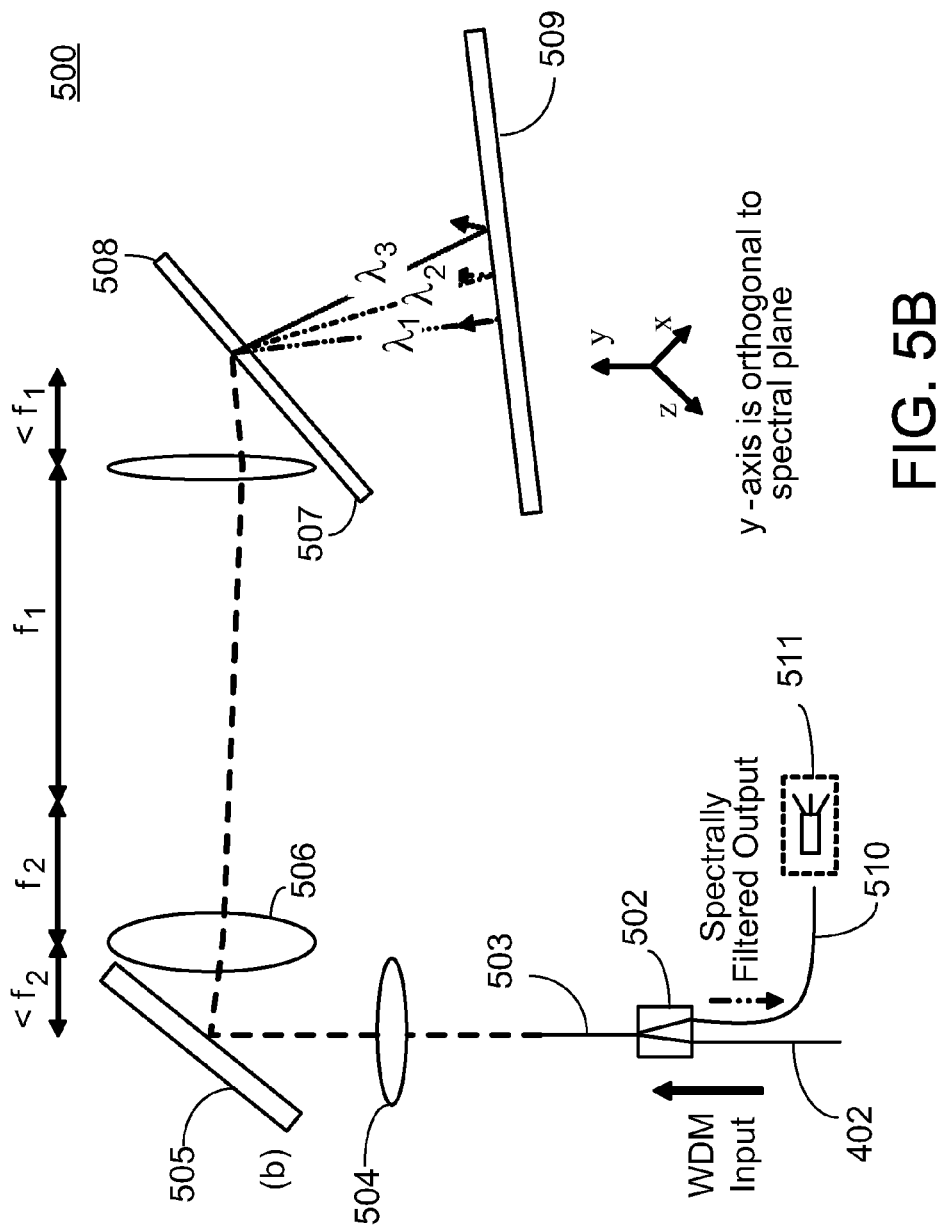
FIG. 5B is another schematic view of the exemplary spectrally adjustable filter of FIG. 5A.

FIGS. 5A, 5B, and 5C show an exemplary non-imaging configuration that employs two lenses 506 and 507 as the optical elements configured to change some or all of the angles of the propagation axes of the dispersed spectral components. With reference to FIG. 5A, exemplary device 500 includes a device input fiber 501, a fiber coupler 502, an input/output fiber 503, an input/output lens 504, and a tiltable mirror 505. For clarity, in FIGS. 5A and 5B only the forward direction of propagation and the initial return path directions of the spectral components are drawn. Also for clarity, FIGS. 5A and 5B show only the central rays of the spectral components.

In this configuration, the input beam passes through lenses 506 and 507 before impinging on dispersive grating 508. The grating 508 disperses the input beam into its spectral components (e.g. $\lambda_1, \lambda_2, \lambda_3, \ldots$) which are then incident on reflector 509. The tilt mirror 505 is actuated about the y-axis to selectively direct spectral components along selected output paths, for example back along their incident paths. Spectral components that are directed back along their incident paths may be coupled into input/output fiber 503, and then directed by coupler 502 to a device output fiber 510. Accordingly, spectral components that are not directed by mirror 505 back along their incident paths might not be coupled back into input/output fiber 503 and, if not coupled, will not be present in the filtered output signal of the device. Optionally, a detection element 511 may be placed at a useful location, for example at the exit of the device output fiber 510, to detect the filtered output. As such, by actuation of mirror 505 and by measuring the detector 511 signal (e.g. current or voltage), the spectral components of the input WDM signal can be discerned. In FIG. 5A, tiltable mirror 505 is actuated about the y-axis to an orientation (a) such that spectral component $\lambda_2$ is reflected by reflector 509 back along its incident path such that it may be coupled into input/output fiber 503, and then directed by coupler 502 to device output fiber 510. For the same tiltable mirror 505 orientation (a), spectral components $\lambda_2$ and $\lambda_3$ are not reflected back along their incident paths and, accordingly, may not be coupled into input/output fiber 503 and may not be present in device output fiber 510. In FIG. 3B. tiltable mirror 50 is actuated about the y-axis to a second orientation (b) such that spectral component $\lambda_1$ is reflected by reflector 509 back along its incident path such that it may be coupled into input/output fiber 503, and then directed by coupler 502 to device output fiber 510. For the same second tiltable mirror 55 orientation (b), spectral components $\lambda_1$ and $\lambda_3$ are not reflected back along their incident paths and, accordingly, may not be coupled into input/output fiber 503 and may not be present in device output fiber 510.

In the exemplary configuration of FIGS. 5A and 5B, the separation between lens 506, having focal length $f_1$, and lens 507, having focal length $f_2$, is substantially the sum of their focal lengths (i.e., $f_1+f_2$), such that collimated beams incident at lens 506 also are collimated after they exit lens 507. As can be understood from the Figures and accompanying description herein, two lenses may enable flexibility in optimizing the combination of a) the spatial extent of the input beam on mirror 505 relative to the spatial extent of the input beam at the dispersive grating 508, b) the sizes and positions of the beams on the lenses 506 and 507, c) the angular magnification/de-magnification of relative input beam propagation angles for different mirror 505 tilt orientations about the y-axis, and d) the path length.

The size of the input beam on grating 508 may affect spectral performance. For example, better spectral resolution and filter shape, including an improved ability to resolve adjacent spectral components, is often achieved when a larger number of grating rulings are illuminated. Consequently, it may be advantageous to maximize the size of the input beam on the grating 508. As another example, the spatial extent of the input beam at tiltable reflector 505 may affect the type of tiltable reflector 505 that can be employed. Mirrors that meet the cost and reliability requirements of telecommunications systems, such as MEMs mirrors, often have relatively small optical surface dimensions. Accordingly, in some applications, it may be beneficial to have a smaller spatial extent of the input beam at tiltable reflector 505 relative to the spatial extent of the input beam at grating 508.

The sizes and positions of the beams on lenses 506 and 507 may be selected in a useful manner, for example to allow the usage of less expensive and/or smaller components. For example, the aberration of a spherical lens may be determined by the size and position of beams on the lens relative to the lens focal length. Consequently, proper design can reduce aberration and enable the use of spherical lenses which are often less expensive than aspherical lenses.

Importantly for the example of FIGS. 5A, 5B, and 5C the elements of exemplary device 500 are placed in a non-imaging configuration, wherein the different input beam propagation paths corresponding to different tilt orientation of tilt mirror 505 about the y-axis do not converge to a point or substantially to a point at dispersive element 508. In particular, dispersive grating 508 is placed at a distance from lens 507 less than the distance between lens 507 and the convergence points of the different input beam propagation paths. In one example, gratin 508 is placed at a distance from lens 507 approximately equal to or less than the focal length ($f_2$) of lens 507. In a further example, grating 508 is be placed at a distance from lens 507 less than ½ of the distance between lens 507 and the convergence point of the spectral components.

Also in this exemplary configuration, lens 506 is placed close to tilt mirror 505, for example at a distance from tilt mirror 505 that is less than the focal length ($f_1$) of lens 506. In some cases, lens 506 may be placed at a distance from tilt mirror 505 that is substantially less than the focal length of lens 506 (e.g. as close to tilt mirror 505 as practical). In an exemplary configuration, lens 506 may be placed at a distance from the tilt mirro 505 that is less than ¼ of the focal length of lens 506.

Some advantages of the configuration of device 500 may include a short optical path length, the ability to control angular magnification/de-magnification of relative input beam propagation angles for different mirror 505 tilt orientations about the y-axis (e.g. to match the relative propagation angles of spectral components dispersed by grating 508 to the available tilt range of tilt mirror 505), the ability to control the spatial extent of the input beams via beam magnification/de-magnification (e.g. to enable a large beam on grating 508 and smaller beam on the tilt mirror 505), and to control the position of the input beams on the lenses (e.g. to enable the beams to be close to the central axis of lens 506).

A further advantage of this non-imaging configuration relative to an analogous two lens imaging configuration, in which the dispersive grating 508 would be at the image plane and in which lens 506 would be at a distance substantially equal to its focal length away from tilt mirror 505, is a much shorter path length. FIG. 5C shows three different input beam propagation paths corresponding to three different orientations ((a), (b), (c)) of tilt mirror 505 about the y-axis. In an analogous imaging configuration, the origination of the different input beam propagation paths at tiltable reflector 505 would be imaged to a point at an image plane 515, and the dispersive element 508 would be placed at that location, resulting in an excessively long path length. In the configuration for a spectral filter in this example, instead of imaging points at a source location to respective points in an image plane, the lenses 506 and 507 function to change the propagation axis and beam profile of input beam for different mirror 505 tilt orientations. The dispersive grating 508 may receive the input beams corresponding to the different mirror 505 tilt orientations at a location at which the central rays of the input beams are incident at different points on dispersive grating 508 (rather than converging to substantially the same point on grating 508, as in an analogous imaging system). Therefore, the dispersive grating 508 can be placed close to lens 507 and a device can have a compact path. In particular, for equivalent focal lengths, and when lens 506 is placed close to tilt mirror 505 (i.e., at a distance shorter than the focal length of lens 506) and dispersive grating 508 is placed close to lens 507, the FIG. 5A optical path length between the tilt mirror 505 and grating 508 of device 500 can be nearly half that of an analogous imaging device. It can be understood that that the angular and beam magnification/de-magnification (which may affect spectral resolution) of both systems may be the same and, as such, there is no inherent compromise in spectral performance of device 500 relative to an analogous imaging device.

For some applications, the configuration of device 500 can have further improved spectral performance relative to the analogous imaging device in that aberrations caused by lens 506 may be reduced since the input beams are incident closer to the optical axis of lens 506 of device 500 than they would be in an analogous imaging configuration in which lens 506 would be located at a distance substantially equal to its focal length away from tilt mirror 505.

For some applications, the configuration of device 500 can have a cost advantage relative to the analogous imaging device. In particular, with an analogous imaging device, some applications may require the device to utilize one or more aspheric lenses within the optics in order to reduce aberrations caused by the lenses. In some cases of such applications, exemplary device 500 would be able utilize a less costly spherical lens for lens 506, since, when lens 506 is placed close to tilt mirror 505, the input beams incident on lens 506 remain close to the optical axis of lens 506.

It can be understood from the Figures and description herein that either selection of a distance between lens 507 and dispersive grating 508 according to the description herein, or selection of the distance between tilt mirror 505 and lens 506 according to the description herein, may be advantageous. Accordingly in exemplary spectrally adjustable filters using the techniques described herein, either of such distances may be selected according to the description herein, or both such distances may be selected according to the description herein.

Figure 6A:
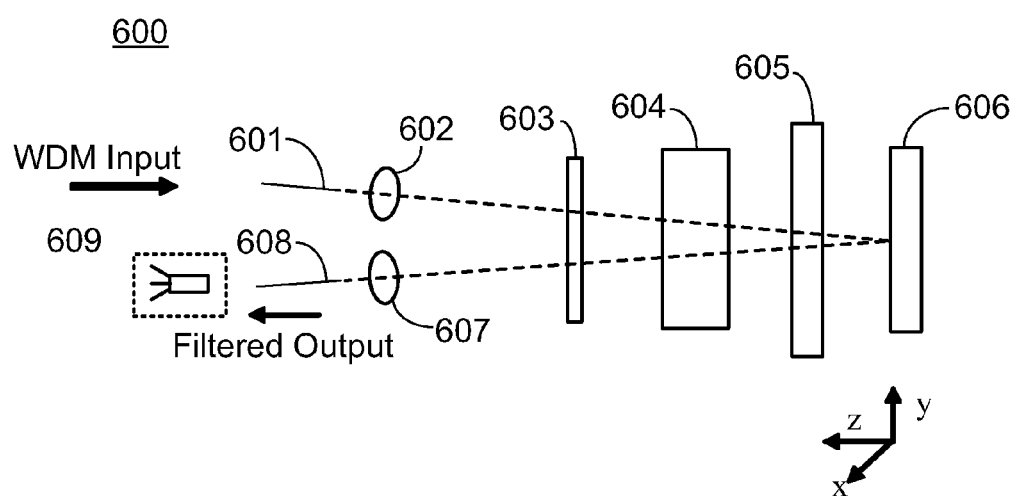
FIG. 6A is a schematic view of another exemplary spectrally adjustable filter.
Figure 6B:
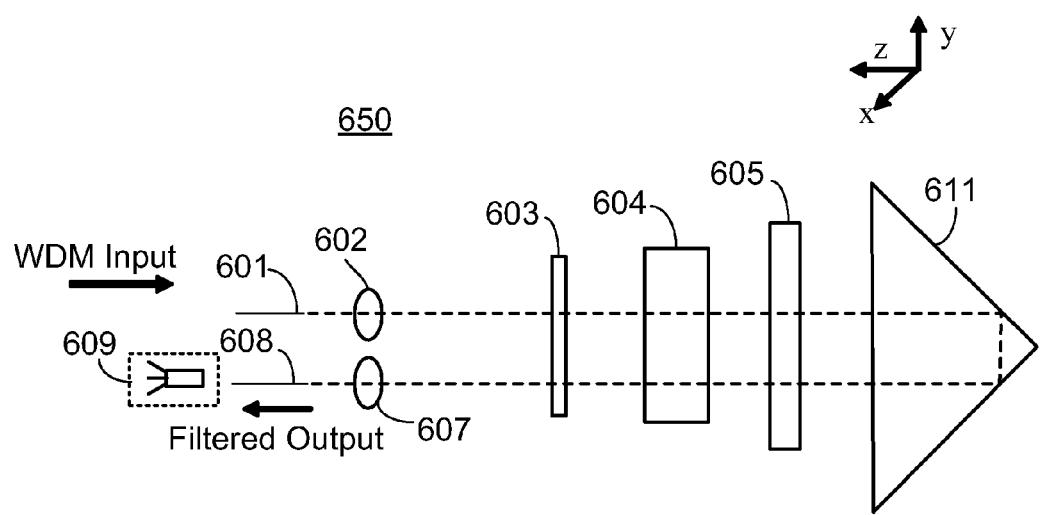
FIG. 6B is a schematic view of another exemplary spectrally adjustable filter.

Other exemplary configurations may eliminate the need for a coupler or circulator, and may reduce insertion loss. FIGS. 6A and 6B show exemplary input and output geometries with WDM inputs and a spectrally filtered outputs. The figures schematically show the direction of propagation of beams in a plane perpendicular to the spectral plane. It can be understood from FIGS. 6A and 6B and the description herein that these geometries can be applied to the exemplary configurations of FIGS. 1 through 5 as well to other configurations.

With reference to the example of FIG. 6A the WDM input signal enters device 600 at input fiber 601. After passing through input fiber 601, the WDM input signal is collimated by input lens 602. The input beam is then incident on tiltable reflector 603, which directs the input beam toward the one or more optical elements, 604. The one or more optical elements 604, for example, may be one or more prisms. After passing through optical elements 604, the input beam impinges on dispersive element 605 prior to being reflected by reflector 606.

As in prior examples, the tiltable reflector 603 is actuated about the y-axis to selectively direct spectral components along selected output paths in the spectral plane. Further, with reference to FIG. 6A, the tiltable reflector 603 is actuated about the x-axis to selectively direct the spectral components along selected output paths along an axis perpendicular to the spectral plane, for example such that the light reflected by reflector 606 is directed to output lens 607 and such that it may be coupled into output fiber 608. Optionally, a detection element 609 may be placed at a useful location, for example at the exit of the device output fiber 608, to detect the filtered output. Other input/output optics (not shown), such as beam expanders/compressors, may be optionally placed between input lens 602 and tiltable reflector 603 and between tiltable reflector 603 and output lens 607.

With reference to the example of FIG. 6B the WDM input signal enters device 650 at input fiber 601. After passing through input fiber 601, the WDM input signal is collimated by input lens 602. The input beam is then incident on tiltable reflector 603, which directs the input beam toward the one or more optical elements, 604. The one or more optical elements 604, for example, may be one or more prisms. After passing through optical elements 604, the input beam impinges on dispersive element 605 prior to being reflected by reflective element 611.

As in prior examples, the tiltable reflector 603 is actuated about the y-axis to selectively direct spectral components along selected output paths in the spectral plane. Further, with reference to FIG. 6B, the tiltable reflector 603 is actuated about the x-axis to selectively direct the spectral components along selected output paths along an axis perpendicular to the spectral plane, for example such that the light reflected by reflective element 611 is directed to output lens 607 and such that it may be coupled into output fiber 608. Optionally, a detection element 609 may be placed at a useful location, for example at the exit of the device output fiber 608, to detect the filtered output. Other input/output optics (not shown), such as beam expanders/compressors, may be optionally placed between input lens 602 and tiltable reflector 603 and between tiltable reflector 603 and output lens 607. As illustrated in FIG. 6B reflective element 611 serves to reflect the selected components along the selected output path. Reflective element 611 could comprise, for example, a retro-reflecting prism or multiple mirrors or any combinations of optical elements that serve to reflect the selected spectral components along the selected output path.

Other exemplary configurations, shown in FIGS. 7A, 7B, 7C, 7D, 7E, 7F, and 7G may allow for multiple device inputs and outputs. The figures schematically show the direction of propagation of beams in a plane perpendicular to the spectral plane. For clarity and convenience, only the generic input and output beam configurations are shown. It can be understood from the Figures and description herein that these multiple input and output geometries can be applied to the exemplary configurations of FIGS. 1 through 5 as well to other configurations.

Figure 7A:
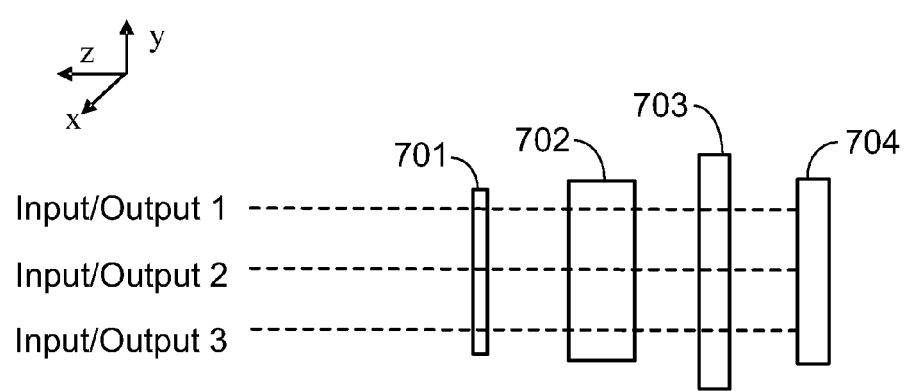
FIG. 7A is a schematic view of an exemplary spectrally adjustable filter having multiple input/outputs.

With reference to the example of FIG. 7A, multiple input beams are incident on a tiltable reflector 701 and pass through optical elements 702, which are configured to change the relative angles of propagation of the multiple input beams in the x-z plane for different tilt orientations of the tiltable reflector 701 about the y-axis. As depicted in FIG. 7A, the input beams and their corresponding output beams propagate along the same path along the axis perpendicular to the x-z plane, and hence, for convenience, are labeled input/output beams. After passing through the one or more optical elements 702, the multiple input beams are incident on a spectrally dispersive element 703. The dispersive element 703 angularly disperses the constituent spectral components of the input beams such that different spectral components propagate along different propagation axes in the x-z plane. A reflector 704 is configured to receive at least some of the dispersed wavelengths and to reflect one or more spectral components back toward the spectrally dispersive element 703, such that the reflected spectral components are incident a second time on dispersive element 703. The tiltable reflector 701 tilts to select at least one and fewer than all of the spectral components for the multiple input beams to be directed along respective selected paths, for example, such that the return trip of the selected spectral components reflected by reflector 704 follow the propagation paths, in the reverse direction, of their corresponding input beams. In an exemplary configuration, the tiltable reflector 703 may be a tilt mirror (e.g. an eletromagnetically or electrostatically-acutated MEMS mirror), the optical elements 702 may be a prism, the dispersive element 703 may be a transmission grating, and reflector 704 may be a fixed mirror, although other useful configurations may be utilized.

Figure 7B:
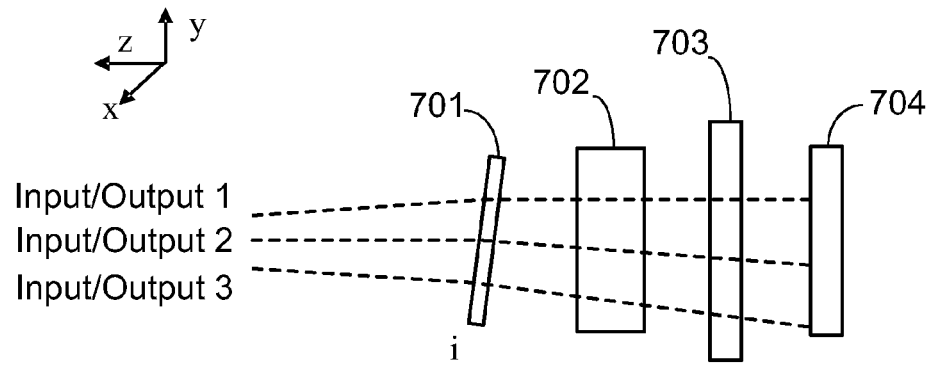
FIGS. 7B, 7C, and 7D is a schematic view of another exemplary spectrally adjustable filter having multiple input/outputs.
Figure 7C:
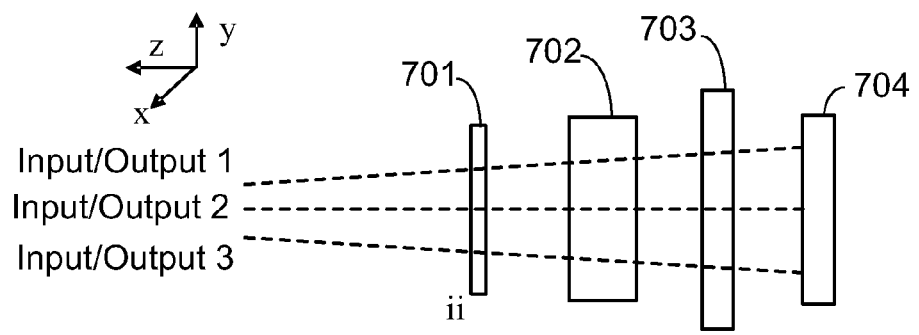
Figure 7D:
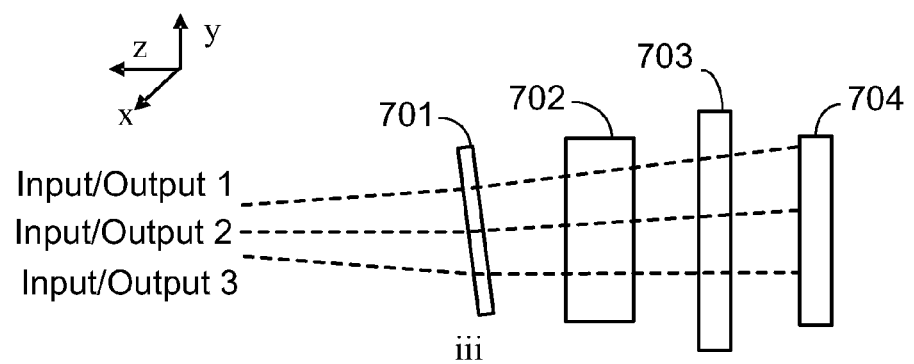

With reference again to the example of FIG. 7A, the input/output beams are shown as being parallel, which, in certain exemplary configurations, may allow for simultaneous scanning of multiple WDM inputs as tiltable reflector 701 is actuated. In other exemplary configurations, as shown in FIGS. 7B, 7C, and 7D, the input/output beams may be directed so they are not parallel. With reference to FIG. 7B, 7C, and 7D, in such configurations, tiltable reflector 701 may be actuated about the x-axis to redirect beams back to respective device input/output ports. That is, tiltable reflector 701 may be actuated about the x-axis to a first position (i) such that input/output beam 1 may be selectively directed back along an incident y-axis path. Tiltable reflector 701 may further be actuated about the x-axis to a second position (ii) wherein input/output beam 2 is directed back along an incident y-axis path. Tiltable reflector 703 may further be actuated about the x-axis to a third position (iii) wherein input/output beam 3 is directed back along an incident y-axis path. In such a manner, a given input/output port may be selected, and the spectral components of the selected input/output may be selectively filtered by actuation of the tilt reflector 701 about the y-axis.

Figure 7E:
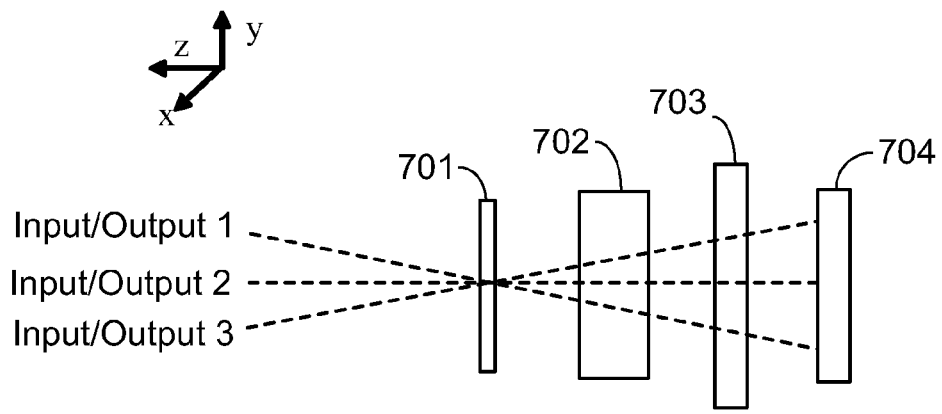
FIG. 7E is a schematic view of another exemplary spectrally adjustable filter having multiple input/outputs.

FIG. 7E shows an exemplary multiple device input and output in which the multiple input/output beams are not parallel and in which they propagation paths of the multiple input/output beams along the y-axis intersect at the tiltable reflector 701. An advantage of the exemplary multiple input/output configuration of FIG. 7E may be that the total transverse spatial extent of the multiple input/output beams in the y-axis may be minimized, and accordingly, may allow for a smaller size tilt mirror 701, or alternatively, may allow for an increased number of input/output beams for a given size tilt mirror 701.

Figure 7F:
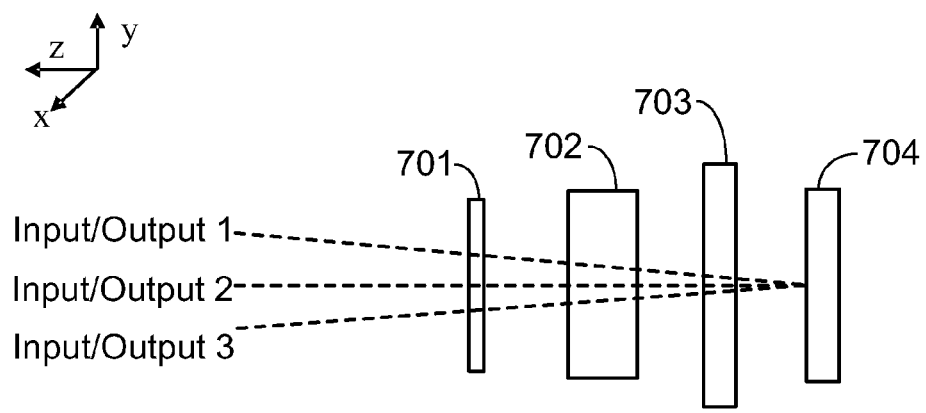
FIG. 7F is a schematic view of another exemplary spectrally adjustable filter having multiple input/outputs.

FIG. 7F shows an exemplary configuration in which multiple input/output beams may be directed to the tiltable reflector 701, such that actuation of tiltable reflector 701 about the x-axis directs spectral components from one input/output direction to another input/output direction. In this exemplary configuration, spectral components from a particular input/output port can be directed to a different input/output port by selectively actuating reflector 703 about the x-axis.

Figure 7G:
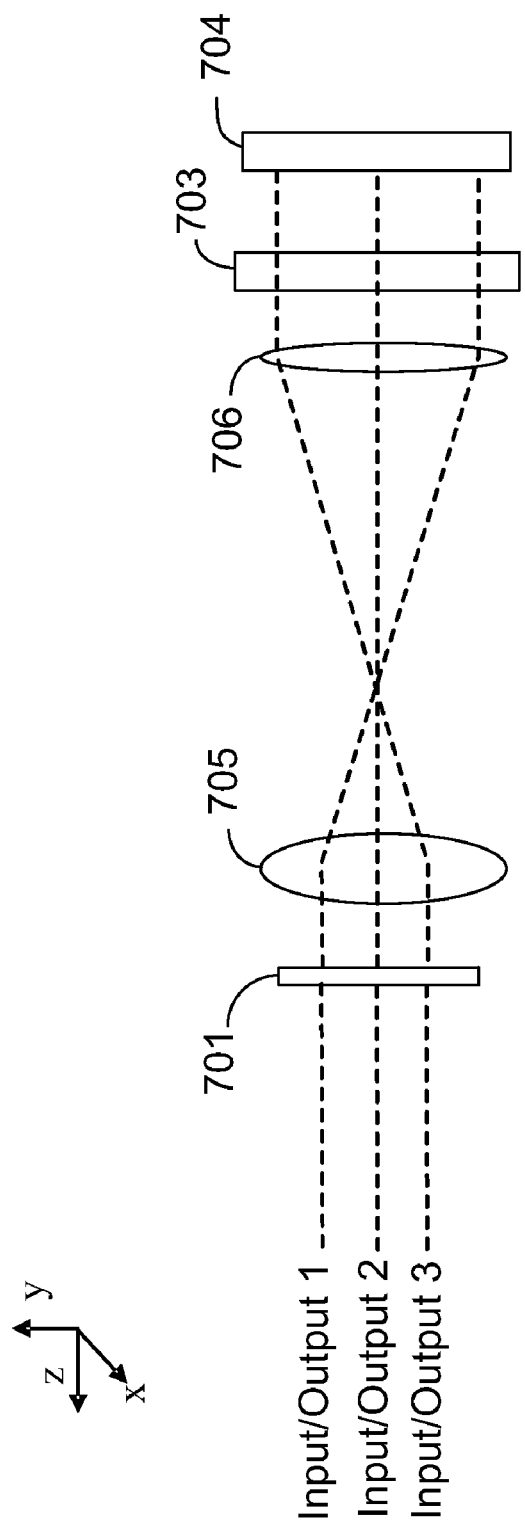
FIG. 7G is a schematic view of another exemplary spectrally adjustable filter having multiple input/outputs.

FIG. 7G shows an exemplary configuration in which the optical elements configured to change some or all of the angles of the propagation axes of the dispersed spectral components comprise two lenses separated substantially by the sum of their focal lengths.

While the exemplary configurations of FIGS. 7A, 7B, 7C, 7D, 7E, 7F, and 7G show three input/output ports, it is understood that there may be provided a different number of input/output ports for the configurations of FIGS. 7A, 7B, 7C, 7D, 7E, 7F, and 7G, for example two or more input/output ports. It is further understood that the input/output ports may have associated one or more couplers, or circulators, and/or separate input and output fibers, among other potential configurations. Further, and in particular for the case (although not limited to the case) in which one or more couplers or circulators are placed at the input/output ports, each port may serve as an input, an output, or both in any of the configurations 7A, 7B, 7C, 7D, 7E, 7F, and 7G.

Other embodiments are within the scope of the following claims. For example, some additional features and configurations that can be incorporated into various implementations are described in U.S. application Ser. No. 11/837,385, incorporated herein by reference.

What is claimed is:

1. An apparatus for spectrally filtering at least one input beam, comprising:

a first reflective element configured to tilt to multiple tilt orientations that each corresponds to a different angle of propagation of at least one input beam;

one or more optical elements configured to change at least some of the relative angles of propagation of the input beam for different tilt orientations of the first reflective element; and a spectrally dispersive element configured to receive the input beam at a location at which the central ray of the input beam is incident at different points on the spectrally dispersive element for each of the tilt orientations, and configured to disperse spectral components of the input beam at different respective angles in a spectral plane;

wherein the first reflective element is configured to tilt to select at least one and fewer than all of the dispersed spectral components to be directed to a selected output path.

2. The apparatus of claim 1, further comprising a second reflective element configured to receive a plurality of the dispersed spectral components from the spectrally dispersive element.

3. The apparatus of claim 2, wherein the second reflective element is configured to direct the selected spectral components to be dispersed at least a second time by the spectrally dispersive element.

4. The apparatus of claim 3, wherein the second reflective element is configured to direct the selected spectral components to be dispersed by the spectrally dispersive element at least four times.

5. The apparatus of claim 1, wherein the one or more optical elements are configured to change at least some of the relative angles of propagation so that a maximum angular separation among the relative angles of propagation decreases.

6. The apparatus of claim 5, wherein the relative angles of propagation of the input beam for different tilt orientations of the first reflective element diverge at a first maximum angular separation and the one or more optical elements are configured to change at least some of the angles of propagation so that the relative angles of propagation of the input beam for different tilt orientations of the first reflective element diverge at a second maximum angular separation smaller than the first maximum angular separation.

7. The apparatus of claim 5, wherein the relative angles of propagation of the input beam for different tilt orientations of the first reflective element diverge at a first maximum angular separation and the one or more optical elements are configured to change at least some of the angles of propagation so that the relative angles of propagation of the input beam for different tilt orientations of the first reflective element converge at a second maximum angular separation smaller than the first maximum angular separation.

8. The apparatus of claim 1, wherein the one or more optical elements are configured to substantially preserve collimation of the input beam over the entire propagation path through the one or more optical elements.

9. The apparatus of claim 8, wherein the one or more optical elements comprise at least one prism.

10. The apparatus of claim 1, wherein the one or more optical elements comprise two lenses having different focal lengths, and wherein the two lenses are separated by a distance that is approximately the sum of the focal lengths.

11. The apparatus of claim 1, wherein the one or more optical elements are configured to change the transverse spatial extent of the input beam such that the transverse spatial extent of the input beam incident on the spectrally dispersive element is larger than the transverse spatial extent of the input beam incident on the first reflective element.

12. The apparatus of claim 11, wherein the transverse spatial extent of the input beam incident on the spectrally dispersive element is at least about two times larger than the transverse spatial extent of the input beam incident on the first reflective element.

13. The apparatus of claim 1, wherein the spectrally dispersive element is configured to disperse the spectral components at the different respective angles from a common spatial mode.

14. The apparatus of claim 13, wherein the one or more optical elements are configured to expand the input beam provided to the spectrally dispersive element from a guided spatial mode of a waveguide to the common spatial mode incident on the spectrally dispersive element.

15. The apparatus of claim 1, wherein the first reflective element is configured to receive multiple input beams, and to tilt to select at least one and fewer than all of the dispersed spectral components of a given input beam to be directed to a corresponding selected output path.

16. A method for spectrally filtering at least one input beam, comprising:
   tilting a first reflective element to multiple tilt orientations that each corresponds to a different angle of propagation of at least one input beam;
   changing at least some of the relative angles of propagation of the input beam for different tilt orientations of the first reflective element; and
   receiving the input beam at different respective locations for each of the tilt orientations, and dispersing spectral components of the input beam at different respective angles in a spectral plane;
   wherein tilting the first reflective element selects at least one and fewer than all of the dispersed spectral components to be directed to a selected output path.

17. A system for monitoring spectra of spectral components of at least one input beam, comprising:
   a first reflective element configured to tilt to multiple tilt orientations that each corresponds to a different angle of propagation of at least one input beam;
   one or more optical elements configured to change at least some of the relative angles of propagation of the input beam for different tilt orientations of the first reflective element;
   a spectrally dispersive element configured to receive the input beam at a location at which the central ray of the input beam is incident at different points on the spectrally dispersive element for each of the tilt orientations, and configured to disperse spectral components of the input beam at different respective angles in a spectral plane; and
   at least one detector configured to receive at least one dispersed spectral component directed to a selected output path by the first reflective element.

18. The system of claim 17, wherein the detector is configured to measure one or more of wavelength, optical power, optical signal-to-noise ratio, bit rate, bit-error rate, and Q.

19. The system of claim 17, further comprising a splitter to direct a first portion of a selected spectral component to a slow-speed detector that measures one or more of wavelength, optical power, and optical signal-to-noise ratio, and to direct a second portion of the selected spectral component to a high-speed detector that measures one or more of bit rate, bit-error rate, and Q.

* * * * *